(12) United States Patent
Olson

(10) Patent No.: US 8,028,841 B2  
(45) Date of Patent: Oct. 4, 2011

(54) FILTER AND FILTER CLEANING APPARATUS AND RELATED METHODS

(76) Inventor: Donald O. Olson, El Cajon, CA (US)

( * ) Notice: Subject to any disclaimer, the term of this patent is extended or adjusted under 35 U.S.C. 154(b) by 736 days.

(21) Appl. No.: 11/658,392

(22) PCT Filed: Oct. 7, 2004

(86) PCT No.: PCT/US2004/033448  
§ 371 (c)(1), (2), (4) Date: Apr. 29, 2008

(87) PCT Pub. No.: WO2005/110576  
PCT Pub. Date: Nov. 24, 2005

(65) Prior Publication Data  
US 2008/0272058 A1 Nov. 6, 2008

(51) Int. Cl.  
*B01D 29/00* (2006.01)  
*B01D 29/68* (2006.01)

(52) U.S. Cl. ........ 210/411; 210/413; 210/355; 210/541; 210/542

(58) Field of Classification Search .......... 210/411, 210/413, 355, 541, 542  
See application file for complete search history.

(56) References Cited

U.S. PATENT DOCUMENTS

| | | | |
|---|---|---|---|
| 191,131 A | 5/1877 | Gainey | |
| 402,738 A | 5/1889 | Hyatt | |
| 2,066,479 A | 1/1937 | MacIsaac | |
| 3,357,566 A | 12/1967 | Schmid et al. | |
| 3,568,414 A | 3/1971 | Spriggs et al. | |
| 4,002,567 A | 1/1977 | Konno et al. | |
| 4,060,483 A * | 11/1977 | Barzuza | 210/741 |
| 4,090,962 A | 5/1978 | Braukmann | |
| 4,692,247 A | 9/1987 | Orlans | |
| 5,236,126 A | 8/1993 | Sawade et al. | |
| 5,824,229 A | 10/1998 | Larkey et al. | |
| 6,001,242 A * | 12/1999 | England et al. | 210/87 |
| 6,267,879 B1 | 7/2001 | Gil | |
| 6,959,818 B2 * | 11/2005 | Olson | 210/411 |

FOREIGN PATENT DOCUMENTS

| | | |
|---|---|---|
| EP | 460842 | 12/1991 |
| GB | 413677 | * 7/1934 |

OTHER PUBLICATIONS

Filtomat, Inc. Advertisement "Water filter puts algae in their place," Grounds Maintenance, p. 56 (Oct. 1989).  
Eagle Publications Advertisement "Filtration News, Special Emphasis: Filter Media Filtration 2002 Show Issue" Eagle Publications, Inc., pp. 17, 30 (Sep. 2002).  
Zurn Industries, Inc. Owner's Catalogue "Self-Cleaning Pipeline Strainers" Zurn Industries, Inc. (Oct. 1974).

* cited by examiner

*Primary Examiner* — Thomas M Lithgow  
(74) *Attorney, Agent, or Firm* — J. Mark Holland & Associates

(57) ABSTRACT

Apparatus and methods include an improved filter and cleaning processes for same. A rotating cleaning element is actuated by vacuum pressure, and relatively precise controls ensure that all portions of the filter's surface are vacuumed cleaned during cleaning cycles. Longitudinal pressure on the rotating cleaning element is balanced to reduce wear and improve performance.

9 Claims, 16 Drawing Sheets

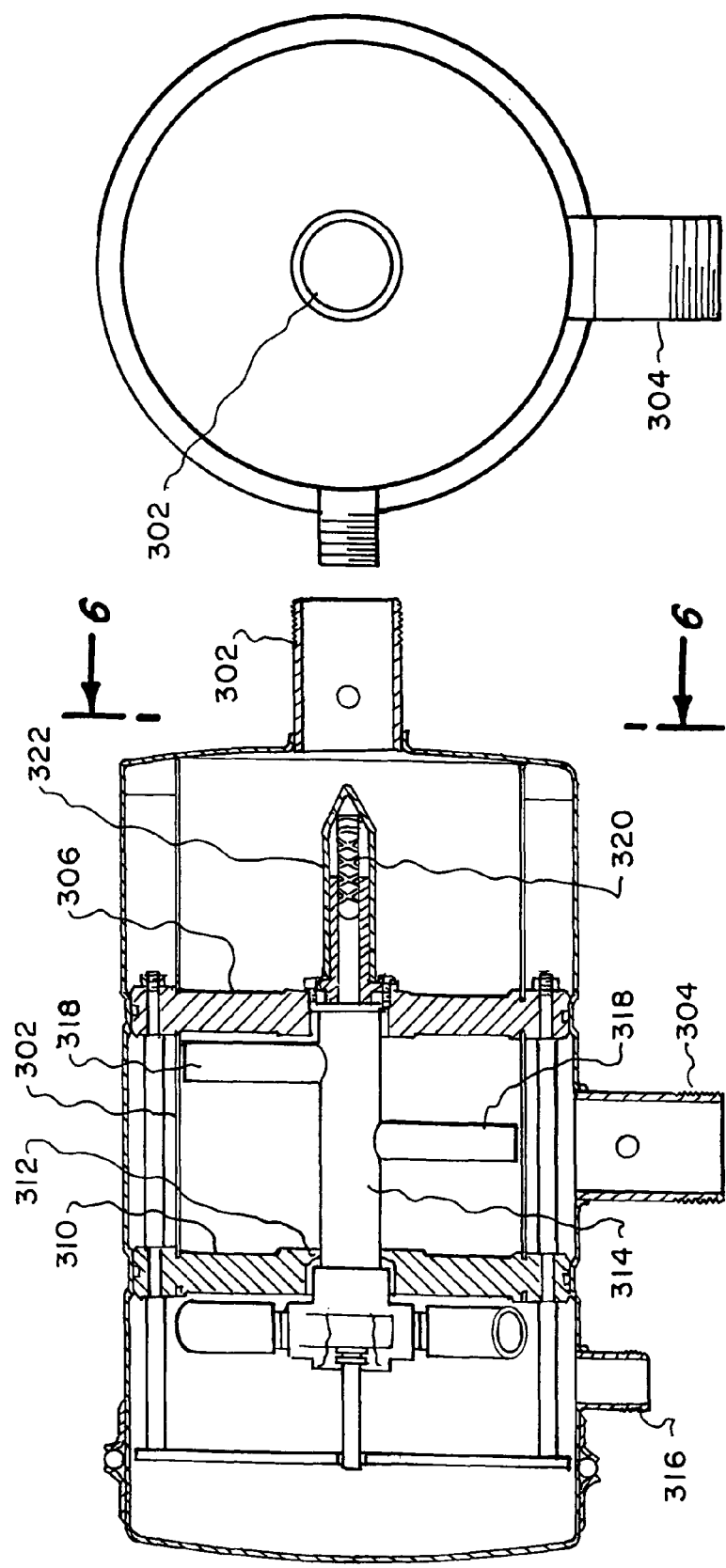

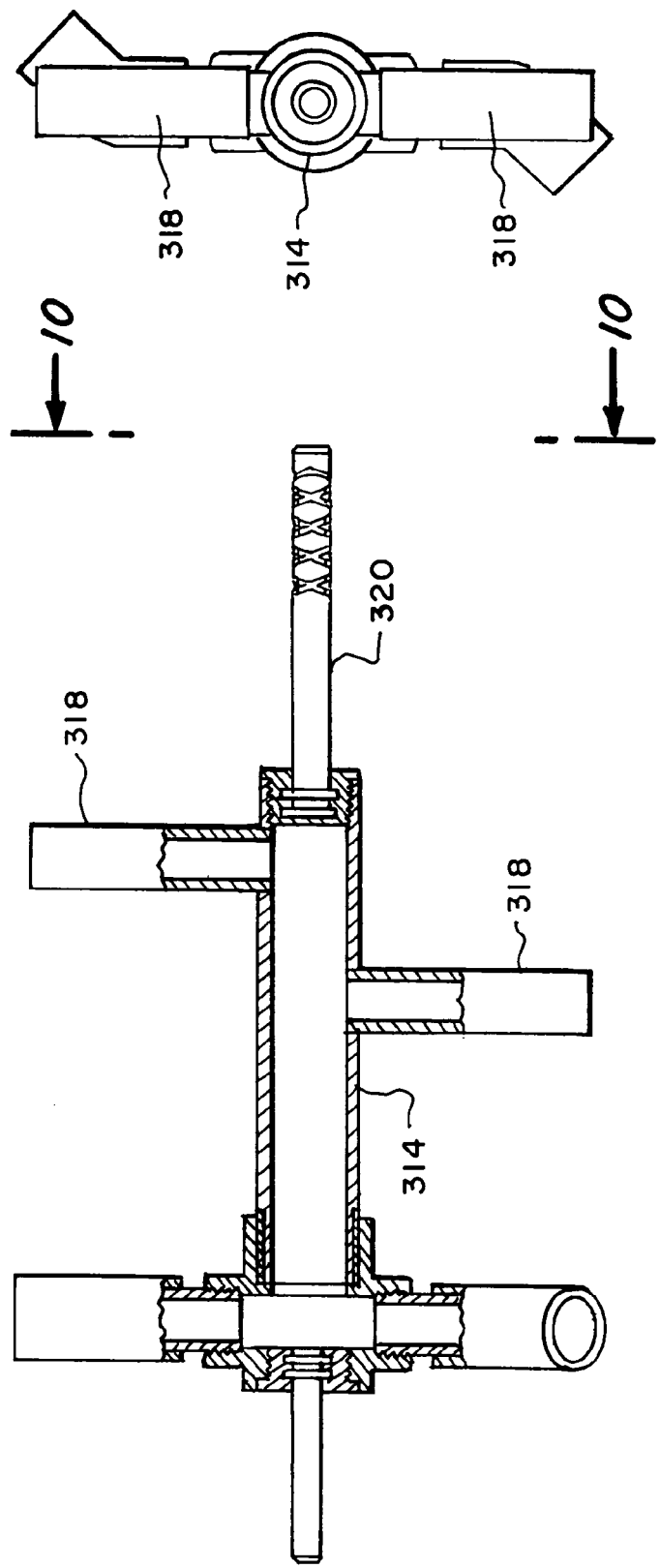

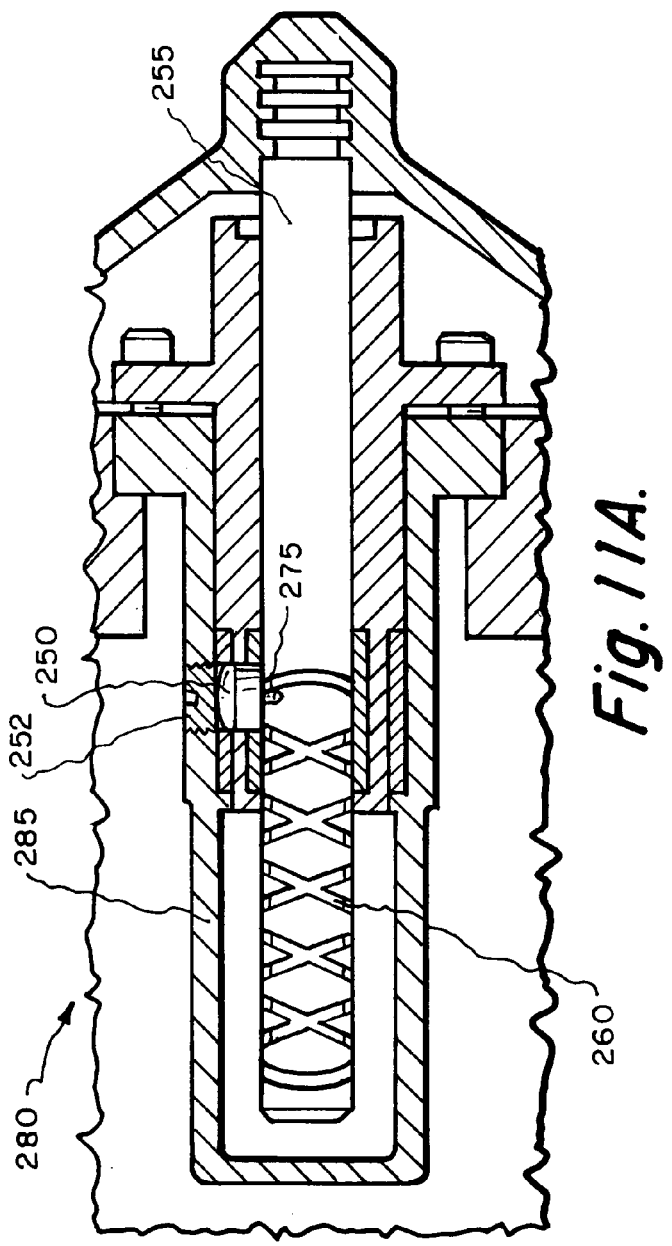
Fig. 11C.
Fig. 11A.
Fig. 11B.

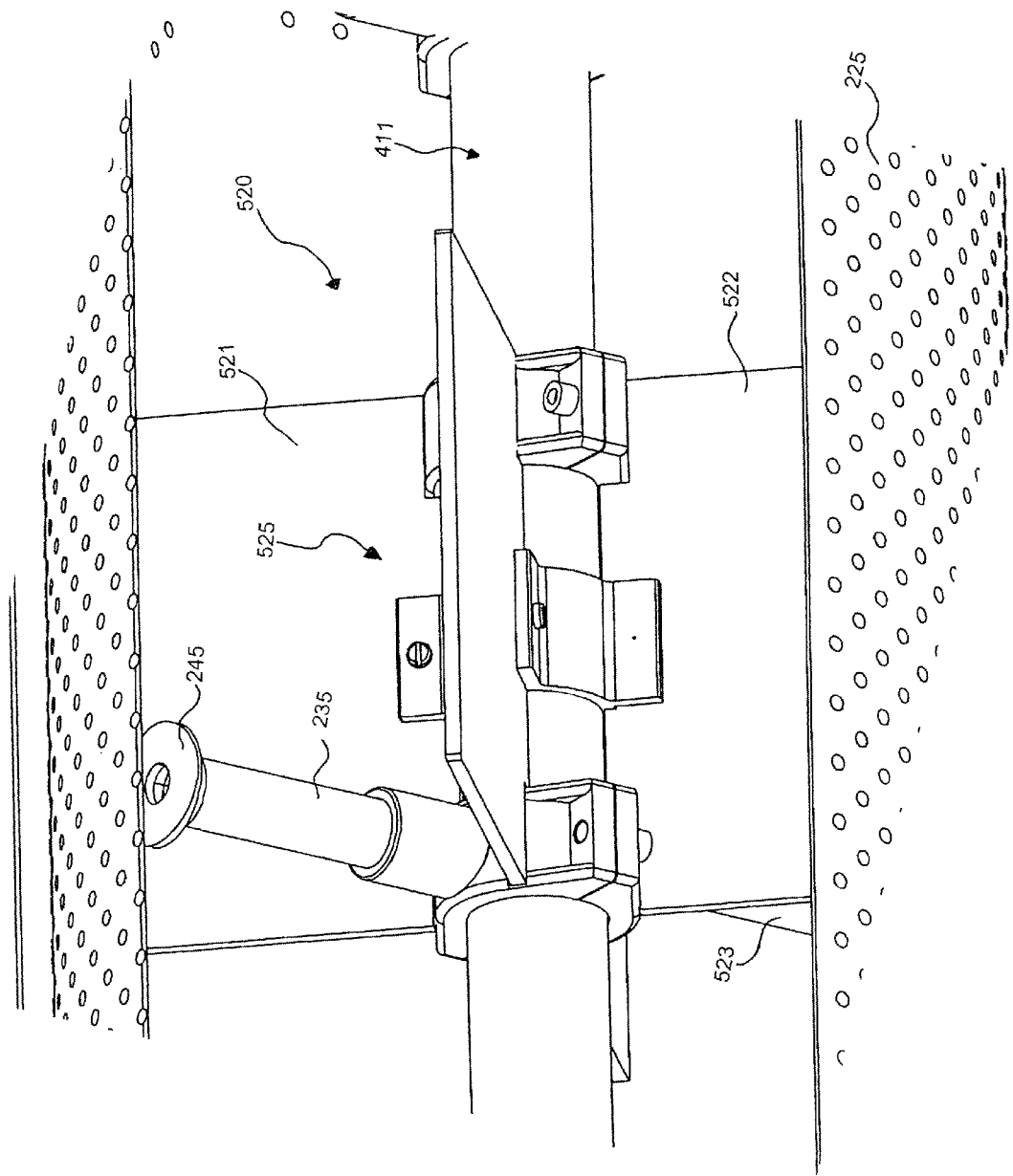

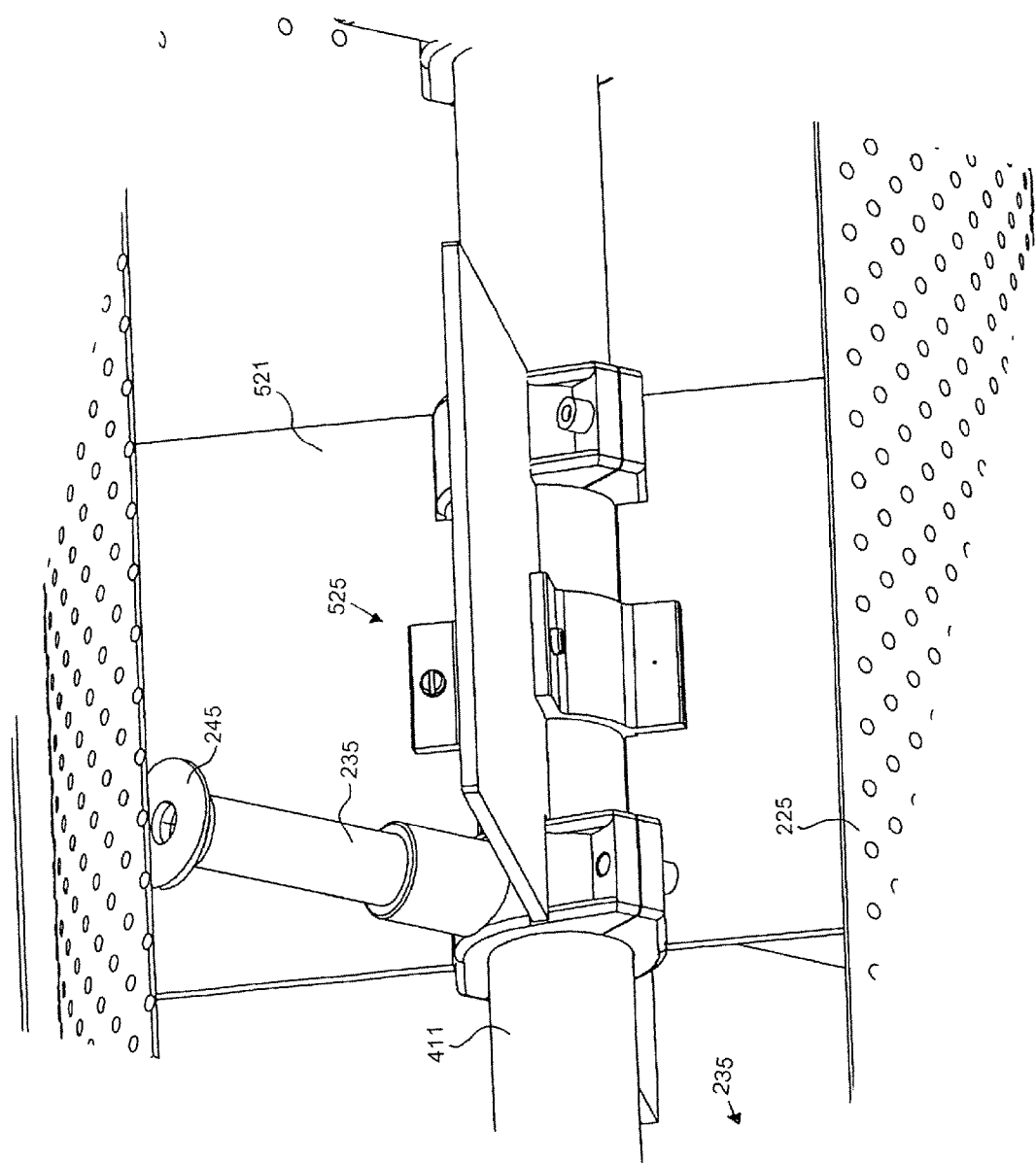

FILTER AND FILTER CLEANING APPARATUS AND RELATED METHODS

This invention relates to filters in general, and more specifically to improved apparatus and methods for automatically cleaning a filter element.

RELATED APPLICATIONS

This application is a National Stage application of International Patent Application No. PCT/US04/33448 filed on Oct. 7, 2004, which claimed priority to issued U.S. Pat. No. 6,959,818 having patent application Ser. No. 10/494,237 filed under 35 U.S.C. §371 on May 3, 2004, which claims priority to PCT/US02/35349 filed on Nov. 4, 2002, which claims priority to U.S. Patent Application Ser. No. 60/338,513, filed on Nov. 2, 2001, now abandoned. The contents of each of the aforementioned applications, and of any other U.S. patent or other reference, if any, cited in this application, are hereby incorporated herein by reference.

BACKGROUND OF THE INVENTION

Prior art filters include housings around filter elements, and some include cleaning elements mounted inside the housing to periodically remove debris and contaminants from the filter elements. Examples of prior art systems and methods are illustrated in FIGS. 1A and 1B. Generally, dirty water or other fluid enters the assembly through a "dirty" inlet, passes into the central portion of the filter assembly, and then is filtered by passing radially outwardly through a cylindrical filter element. During use, the high pressure filtering area is "separated" from a lower pressure flushing portion of the assembly by a divider or separating bulkhead.

In these devices, when the filter becomes clogged or too dirty, a valve on the flush outlet is opened to "clean" or "vacuum" the filter. The valve can be actuated, for example, when the system reaches a predetermined pressure differential between the dirty inlet and the clean outlet. The differential typically is monitored by sensors, and that differential typically increases as filtered materials collect on the inside of the filter element.

In systems such as illustrated in FIGS. 1A and 1B, the vacuum cleaning is provided by relatively low pressure at the flush outlet (when the flush valve is opened). That low pressure communicates through a motor assembly connected to vacuum rotors. The rotor inlets are positioned close to the filter element. The relatively lower pressure at the flush outlet creates a vacuum that sucks the debris or buildup formed on the inside of the filter back through the vacuum rotors, back out the motor assembly, and finally through the flushing/cleaning outlet. The aforementioned fluid flow generates a thrust on the motor assembly outlets that rotates the motor and the entire assembly connected to it. The rotating assembly includes the vacuum rotors, which (by rotating) pass over and "vacuum clean" at least some portion of the interior surface of the filter element.

Prior art systems have several shortcomings. Among other things, although systems such as illustrated in FIG. 1A have vacuum rotors sized and positioned to cover substantially all of the filter surface within a single 360 degree rotation, those rotors require large valves and correspondingly large fluid flow to provide sufficient vacuum suction to clean the filter satisfactorily.

Systems such as FIG. 1B typically use smaller valves, but do not provide a "controlled" cleaning cycle that reliably cleans the entire surface of the filter. Instead, the vacuum rotors and motor assembly of FIG. 1B not only rotate during cleaning but also traverses axially from a right-most position (such as shown in FIG. 1B) to the left (not shown). A tight fit 25 is provided between the separating bulkhead and the motor assembly, that permits the motor to rotate within the bulkhead but also permits a "bleed" of pressure past the tight fit 25. When the flush outlet is opened, the high-pressure area adjacent the filter can gradually bleed through the tight fit into the low-pressure area, eventually equalizing those two pressures. Until the pressures equalizes, however, the higher pressure tends to force the motor/rotor assembly to the left.

That movement to the left is impeded to some degree by relatively incompressible fluid in a cylinder 20. To permit some movement to the left, the opening of the flush outlet is coordinated with opening a tiny bleed port 28 at the end of a cylinder 20. That opened bleed port 28 permits a piston 22 in the cylinder 20 (which piston is connected to the motor/rotor assembly) to move toward the left as water is forced out the bleed port 28.

Once the pressure has equalized, the flush outlet and bleed port 28 are closed, and the larger effective surface area on the left side of the motor/rotor assembly forces the assembly to move back to the right. During that portion of the cycle, there is no vacuum action at the rotor inlets, so the filter is not being cleaned. Said another way, the only "cleaning" that occurs is during the single pass from right to left. Depending on the pressure differential, the condition of the various seals and fitting areas, and other factors, that single pass movement from right to left can occur so quickly that it is uncertain that the rotor inlets will pass over all of the filter's interior surface. Those areas that are missed remain dirty, decreasing efficiency and performance of the filter, and requiring more frequent (albeit less efficient) cleaning cycles.

OBJECTS AND ADVANTAGES OF THE INVENTION

It is, therefore, an object of the invention to provide improved apparatus and methods for cleaning a filter element. In the preferred embodiment, relatively smaller valves and fluid flows can be used to vacuum the inside of the filter surface in a very controlled manner, to ensure that all of the surface gets cleaned, and pressure offset or balancing apparatus can be used to reduce the wear on the components and improve its performance. As with prior art devices, the apparatus and methods can be automated, via sensors and the like.

Other objects and advantages of the invention will be apparent from the following specification and the accompanying drawings, which are for the purpose of illustration only.

BRIEF DESCRIPTION OF THE DRAWINGS

FIG. 5 is a partially cutaway sectional view of one of the many alternative embodiments of the invention;

FIG. 6 is an end view of the device of FIG. 5, taken along line 6-6 in FIG. 5;

FIG. 9 illustrates further internal detail of the assembly of FIGS. 5 and 7;

FIG. 10 is an end view taken along line 10-10 in FIG. 9;

FIG. 11A is a sectional view taken along line 11A-11A in FIG. 3;

FIG. 11B is similar to FIG. 11C, and is a side elevation view of a preferred pawl 250 turned 90 degrees from the orientation shown in FIG. 11A;

FIG. 11C is similar to FIG. 11B, and is a side elevation view of a preferred pawl 250 in the same orientation as shown in FIG. 11A.

FIG. 17 is a perspective view of one embodiment of a speed reducer in accordance with the present invention; and FIG. 18 is another perspective view of the speed reducer of FIG. 17.

DETAILED DESCRIPTION

Figure 1A:
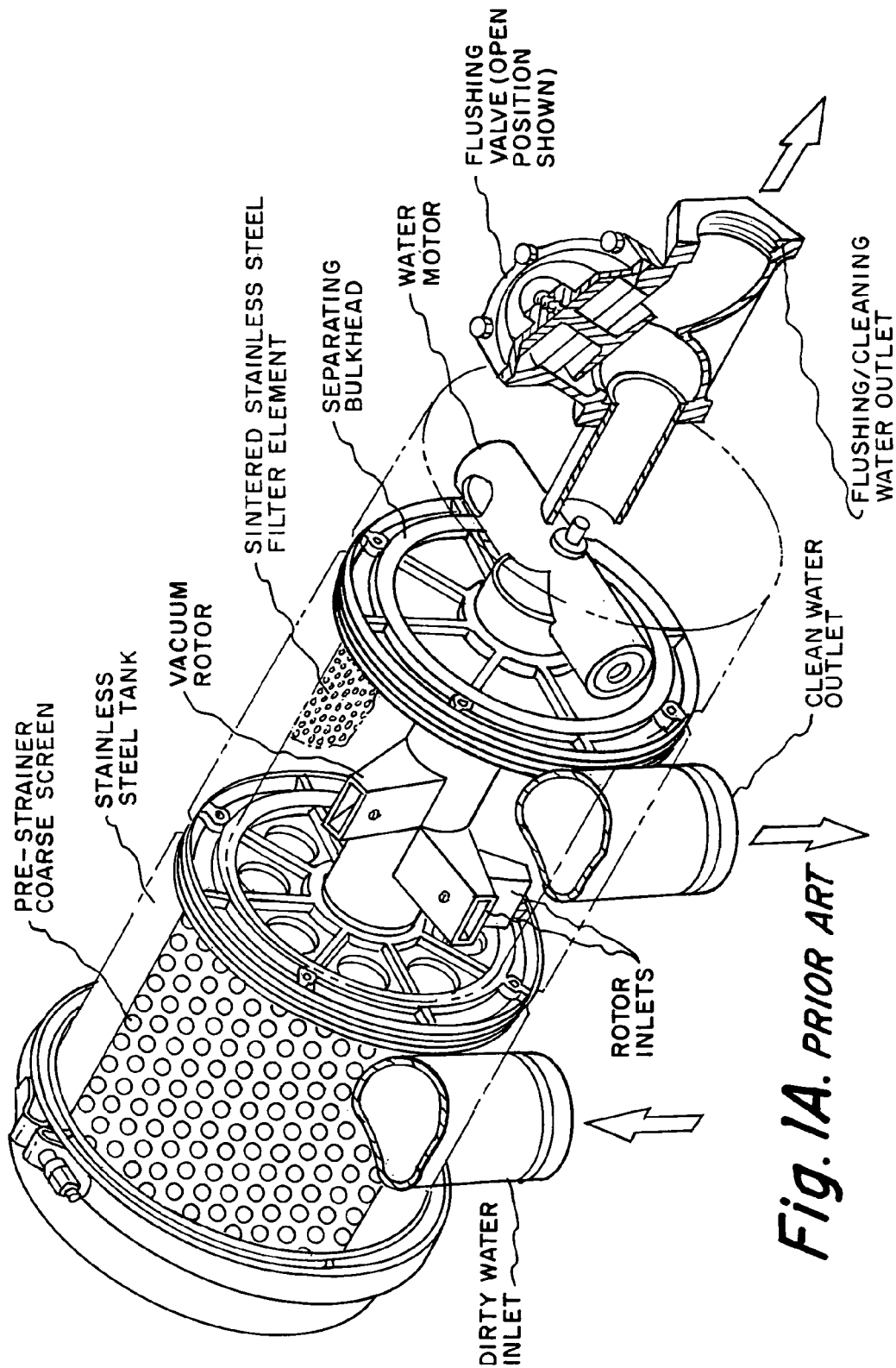
FIG. 1A is a partially cutaway perspective view of a prior art device.
Figure 1B:
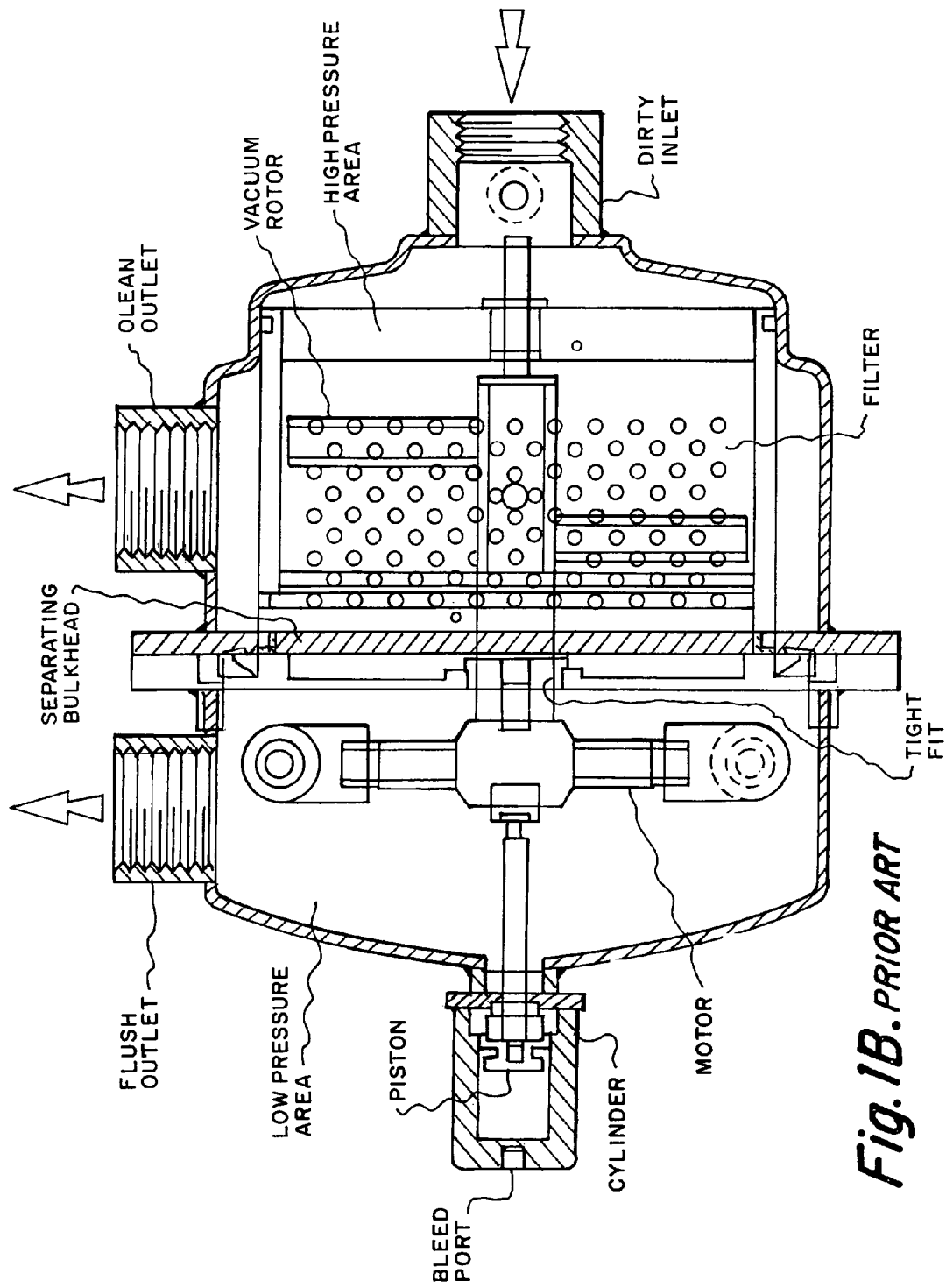
FIG. 1B is a sectional view of another prior art device.
Figure 2:
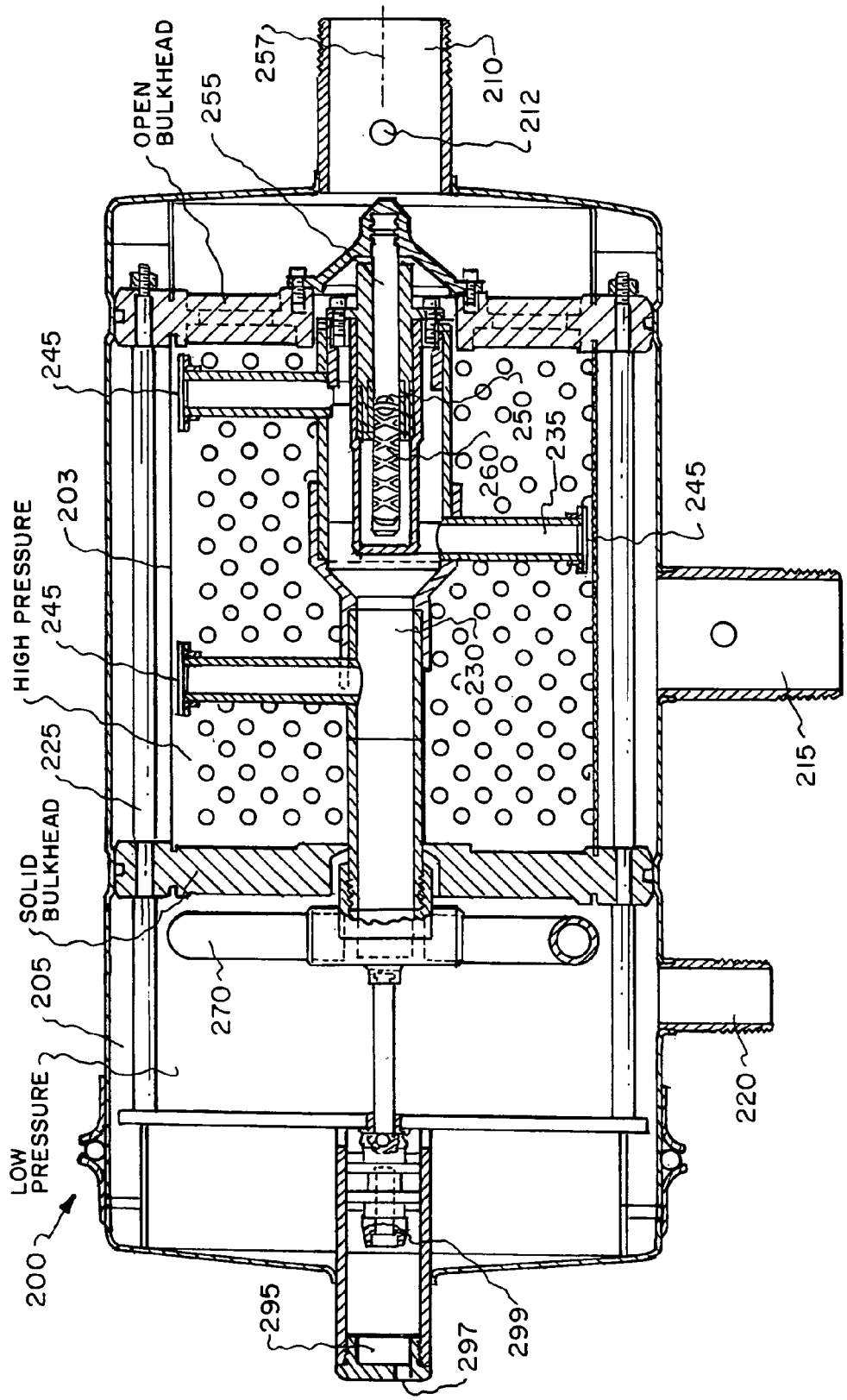
FIG. 2 is a sectional view of a preferred embodiment of the invention.
Figure 3:
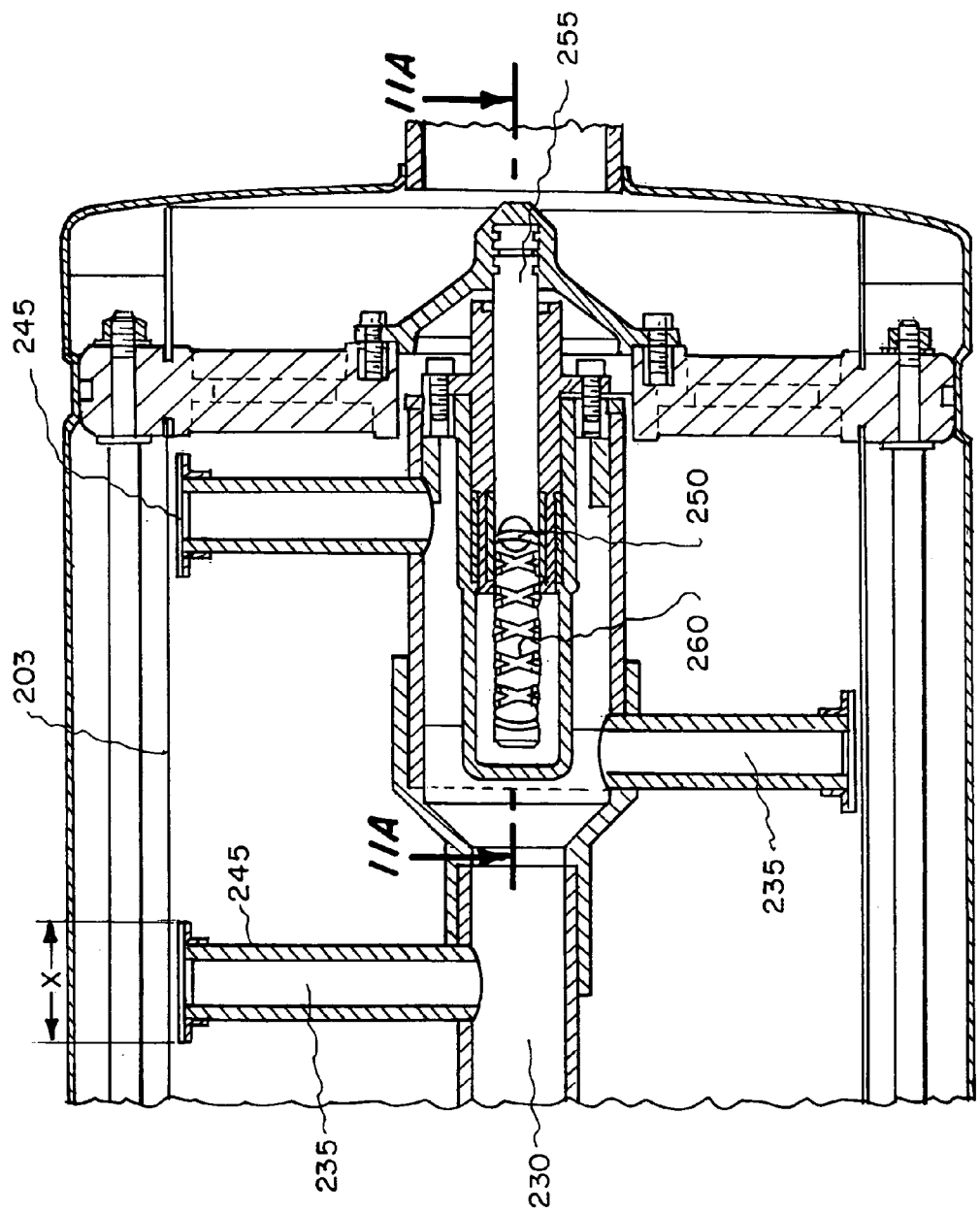
FIG. 3 is an enlarged view of a portion of the right end of FIG. 2.
Figure 4:
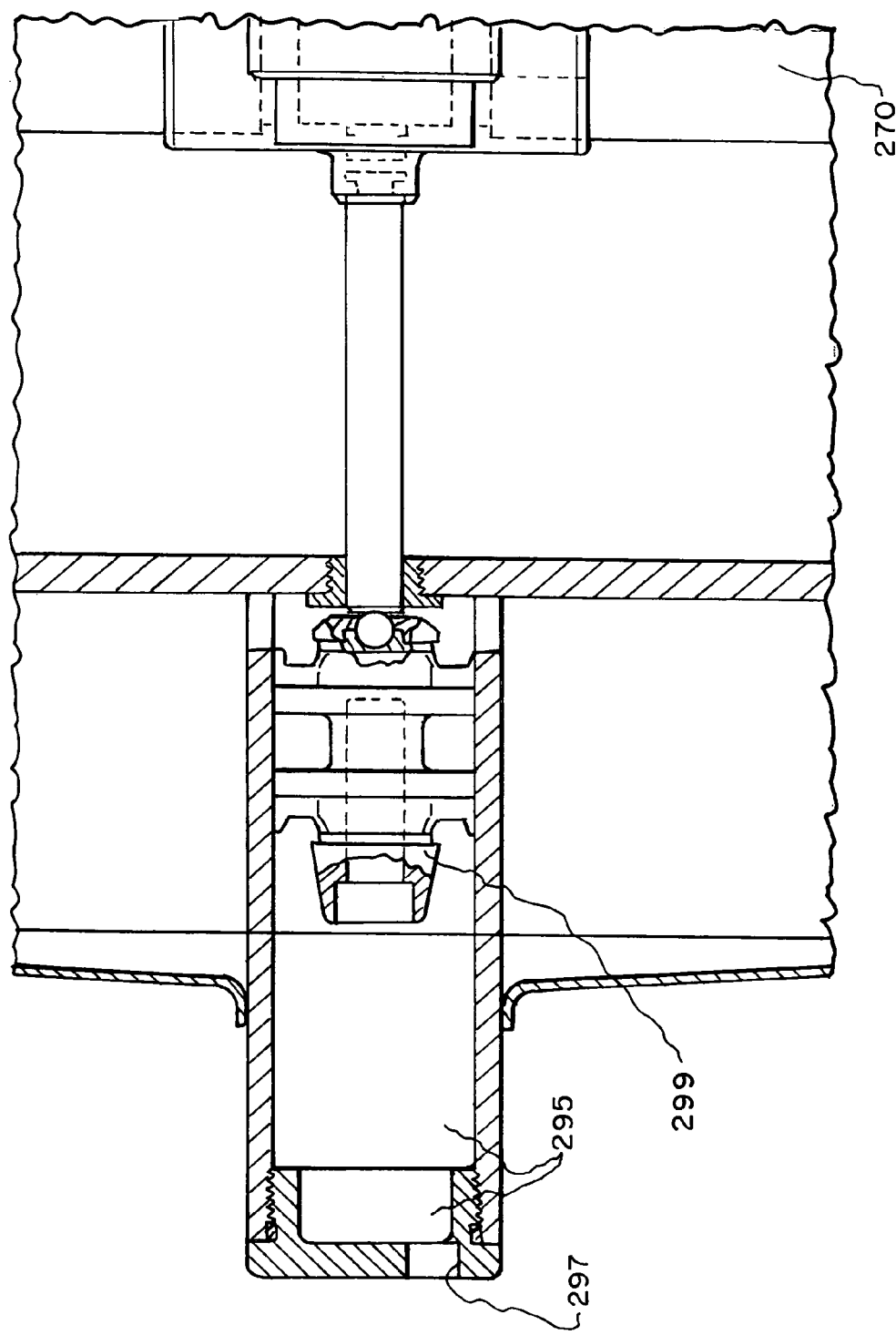
FIG. 4 is an enlarged view of a portion of the left end of FIG. 2.
Figure 8:
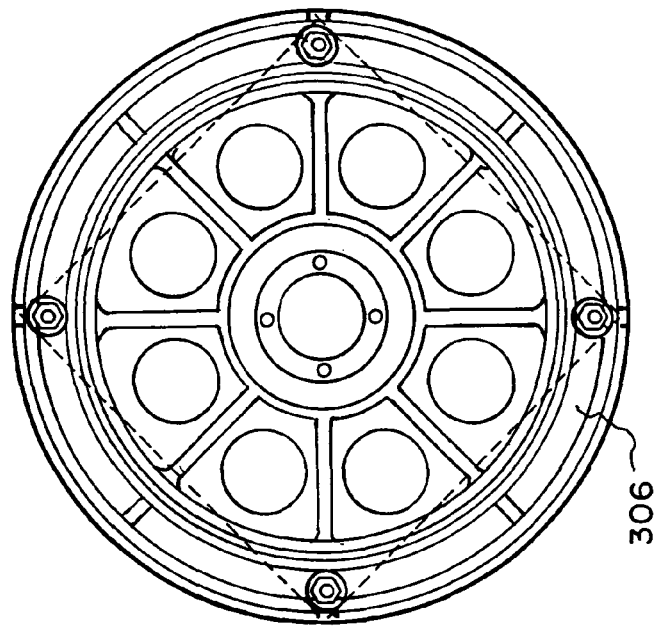
FIG. 8 is an end view taken along line 8-8 in FIG. 7.

A preferred embodiment of the invention is illustrated in FIGS. 2-4, and includes apparatus 200. Although it utilizes certain generally known concepts including some of those in the prior art of FIGS. 1A and 1B, as described herein, the preferred embodiment provides much more precise control than prior art devices of which the inventor is aware, and better ensures that most or all of the interior surface of the filter element gets cleaned during each cleaning cycle.

Preferably, the components of the invention are fabricated from suitably strong materials to withstand the various pressures and cyclical repetitions of movements described herein. In addition, persons of ordinary skill in the art will understand that the materials preferably should be resistant to corrosion and other deterioration that may be associated with the various liquids and debris being filtered.

As best shown in FIGS. 2 and 3, the preferred embodiment of the filter cleaning apparatus 200 comprises a housing 205 having an inlet 210, a clean outlet 215, and a flushing outlet 220. The preferred apparatus further includes a filter element 225 positioned to filter fluid flowing from the housing inlet 210 to the clean outlet 215. A cleaning element 230 having one or more vacuum rotors 235 is further included. Preferably, the vacuum rotor or rotors 235 rotate about a central axis 257 of the cleaning element 230. The vacuum rotor 235 preferably includes a rotor inlet 245 positioned to collect debris from the filter element 225 and guide debris from the filter element 225 for eventual dispensing out of the flushing outlet 220.

The cleaning element 230 also preferably includes a water-driven rotor motor 270 to facilitate rotational movement of the cleaning assembly or element 230, in response to the vacuum action through that assembly as debris is vacuumed from the filter. As explained below, this rotation preferably is translated into bi-directional linear movement of the assembly 230 along the lengthwise axis 257. During filter cleaning, fluid moving through the rotor motor 270 generates a thrust on the motor outlets that rotates the rotor motor 270 and thereby the entire assembly 230 connected to it. Thus, the cleaning element 230 may also be referred to as a rotor/motor assembly.

Among the many alternative embodiments of the invention, the vacuum rotor 235 may be rotated by motor power other than the vacuum thrust of the water as it exits during the cleaning cycle of the apparatus. For example, electrical or manual power (not shown) may provide the force necessary to rotate the cleaning element 230.

The cleaning element 230 preferably is configured and positioned to be actuated by opening the flushing outlet 220. Opening and closing the flushing outlet 220 preferably is controlled by conventional pressure sensing apparatus, in response to pressure differentials between the filter section and the flushing section of the apparatus 200. Opening that flushing outlet 220 preferably creates a vacuum flowing from the inlets 245 of vacuum rotors 235 through motor 270, toward outlet 220. That vacuum preferably results in a fluid flow along that same path, which in turn preferably causes the desired rotation of the rotor inlet or inlets 245. As explained herein, that preferred rotation of cleaning element 230 (about the axis 257) and the preferred longitudinal displacement of cleaning element 230 (along the lengthwise axis 257) results in the inlet or inlets 245 passing over (and thereby "vacuuming") substantially the entire interior surface of filter element 225. This vacuuming preferably removes accumulated debris from the filter surface 203.

Persons of ordinary skill in the art will understand that the relative number and relative dimensions of the inlets 245 can vary according to the particular application. Among other things, the relative size of the interior surface of filter element 225 and the specific dimensions and design of the preferred bi-directional track and pawl assembly (discussed below) can impact the necessary and/or desired size and spacing of the openings or inlets 245 along the cleaning element 230. Although three such inlets 245 are illustrated in FIGS. 2-4 and two are shown in FIGS. 5-10, persons of ordinary skill in the art will understand that as few as one, and many more than three, could be used for certain applications.

To provide higher vacuum force, the inlet or inlets 245 preferably are less (individually and collectively) than the full width of the filter element 203. Accordingly, to ensure that the entire interior of the filter element 203 is vacuumed during the cleaning cycle of the apparatus, the apparatus 200 preferably includes a linkage to move the assembly 230 along the lengthwise axis 257 during the vacuum/rotation cycle. In the preferred embodiment, this linkage includes a tracking guide or pawl 250 that cooperatively engages a helical or bi-directional thread 260.

In the preferred embodiment, the thread 260 is located on a central screw 255 and the pawl 250 is rotatably positioned in a wall of the cleaning element 230. However, persons of ordinary skill in the art will understand that the thread and pawl could instead be reversed (with the pawl 250 located in the central screw or core element 255 and the thread 260 located on the cleaning element (rotor/motor assembly) 230). In any case, the assembly preferably ensures complete (or substantially complete) cleaning of the filter element 225 by the rotor inlet or inlets 245, by the combination of rotational and linear movements of the assembly 230 about and along the screw 255, as described herein.

Persons of ordinary skill in the art will understand that, during the cleaning cycle, those movements preferably expose all (or virtually all) of the interior surface of the filter element to the vacuum provided via the inlet or inlets 245. In the preferred embodiment, if there is sufficient pressure differential to rotate the assembly 230 enough times, a cleaning cycle can even expose some or all of the interior filter surface to the vacuum at inlet 245 more than once (as the assembly 230 cycles back and forth along the bi-directional thread 260).

As best illustrated in FIGS. 11A-C, the tracking guide or pawl 250 preferably is rotatably positioned in a transverse cylindrical opening formed in the cleaning element 230. This preferably permits the pawl 250 to rotate around an axis transverse to the central axis 257 as the track or thread 260 passes beneath it (or it passes over the thread) during the cleaning cycle. That rotation preferably is caused by interaction between the pawl 250 and helical track 260. When assembled, a tooth 275 of the pawl 250 preferably extends toward and engages and slides through the trough or thread 260 on the central screw or core element 255. During the rotation of the cleaning element 230 as part of the cleaning cycle, the orientation of the tooth 275 follows the thread 260, including during any reversals of the thread direction such as preferably occur with the bi-directional embodiment of thread 260.

In the preferred embodiment, the cleaning element 230 and the pawl 250 mounted therein are capable of rotational movement about the central screw 255, and the central screw 255 is fixed relative to the housing 205. In some of the many alternative embodiments of the invention (such as illustrated in FIG. 5 and FIGS. 12-15), the apparatus 200 may have a central screw 255 that rotates with the cleaning element 230, while the engaging pawl 250 is "fixed" relative to the housing 205.

Further regarding the embodiment of FIGS. 5-10, many of the general principles of that embodiment are the same as discussed herein for the embodiment of FIGS. 2-4. Dirty liquid comes into the apparatus through inlet 302, filtered or clean liquid exits the apparatus via clean outlet 304 after passing through an open bulkhead 306 and a filter 308. A solid bulkhead 310 includes a tight fit 312 against the rotating cleaning element assembly 314. Valve means (not shown) can be opened on a vacuum/cleaning outlet 316 to actuate the flushing of debris out that outlet 316 from the interior surface of the filter 308.

Among the differences between the embodiment of FIGS. 2-4 and that of FIGS. 5-10 is the number of vacuum rotors/inlets 318 (only two rotors in the embodiment of FIG. 5, rather than the three of FIG. 2) and the location and connection of the threaded core element 320 and pawl 322 (both are to the right of the open bulkhead 306 in the embodiment of FIG. 5, but are to the left of the open bulkhead in the embodiment of FIG. 2).

The tracking guide or pawl 250 preferably is held in place in a manner permitting its rotation, as described above. In the preferred embodiment, this is accomplished by a securing member such as a screw 252 (FIG. 11A) formed of brass or other similarly suitable bearing material (to permit the rotation of the pawl). Persons of ordinary skill in the art will understand that the retention of pawl 250 can be accomplished in a wide variety of ways. By way of example, for alternative embodiments (not shown) in which the pawl is mounted on the central screw and has a tooth that extends outwardly to engage a surrounding thread pattern, a transverse hole can be provided into the central screw, a spring member inserted into the hale, and the pawl then inserted atop the spring. In such an embodiment, the spring is initially compressed to permit assembly of the pawl within the thread, and thereafter urges the pawl outwardly into desired engagement with the thread. As indicated above, the spring and/or a contact portion thereon preferably (and similarly to screw 252) is fabricated of brass or similar material so that it can provide a bearing surface for allowing the desired rotation of the pawl 250 when it is seated on the spring.

Thus, during the cleaning cycle, the tracking guide element 250 (and the rotating vacuum rotor/motor assembly 230 in which it is mounted) preferably cycles at least one time along the entire length of a preferred bi-directional thread 260. The preferred bi-directional embodiment of thread 260 permits the vacuum cleaning to occur on a continuous loop/path (given sufficient pressure differential to rotate the assembly enough times), thereby moving the inlets 245 around and back and forth along the axis 257. In contrast, prior art devices of which the inventor is aware only make at most a single pass along the length of the axis, and any "remaining" drive energy simply rotates the vacuum inlets at a fixed position along the length of that axis (typically at the position of lengthwise axial movement that is farthest away from its starting/resting position during times other than the cleaning cycle). In other words, prior art systems do not force the vacuum inlets back across the interior surface of the filter. The present invention does so, thereby permitting the opportunity for further/better cleaning of the filter during any given cleaning cycle.

In the preferred embodiment, the pitch and axial length of the bi-directional thread 260 of the central screw 255 or the cleaning element 230 is preferably selected or adapted based on the relative size and numbers of the rotor inlets 245. Persons of ordinary skill in the art will understand that proper selection of that pitch can ensure, for example, that a single 360 degree rotation of the vacuum rotor 235 will move the vacuum rotor/motor assembly 230 axially (along the length of axis 257) no more than the width of the rotor inlet 245. In the preferred embodiment, each rotation of the rotor/motor assembly 230 finds a given rotor inlet 245 positioned immediately beside (or overlapping) the path it cleaned on the previous rotation.

Persons of ordinary skill in the art will understand that, among the many alternative embodiments of the invention (not shown), the thread pitch could be different. By way of example and not by way of limitation (and not shown in the figures), where a plurality of inlet arms 235 are provided at the same axial lengthwise position along the assembly 230, the thread pitch could be such that a 360 degree rotation moved the assembly more than one inlet's width along the length of axis 257. For example, if two such arms are aligned with each other on the assembly 230, the entire interior of the filter could be vacuumed by a thread pitch that moved the assembly one inlet's width in only 180 degrees of turning (three such aligned arms—again, not shown in the current drawings—would permit a thread pitch requiring only 120 degrees of rotation for each axial lengthwise distance of movement, and so on).

In addition, when the rotor/motor assembly 230 has completed its motion from right to left (as shown in the drawings), the preferred linkage between bi-directional thread path 260 and pawl 250 ensures that the rotor/motor assembly 230 then reverses itself and moves back to the right, vacuuming back over the filter's surface 203 again. Opening the flush outlet/valve 220 for a sufficient period of time ensures that no area of the filter surface 203 is left uncleaned, and can even ensure that multiple cleaning passes are made in each direction (right and left) during each cleaning cycle.

If the relative flow rates of dirty water/liquid in (via inlet 210), filtered water out (via outlet 215), and vacuumed debris out (via outlet 220) are properly controlled with respect to each other (via valves or other conventional or suitable mechanisms), the system can be operated so that it continues filtering (and dispensing filtered liquid out the outlet 215) during the entire cleaning cycle. Similarly, by closing the clean outlet 215 and leaving open the inlet 210 during the cleaning cycle (or by providing sufficient excess fluid flow into the inlet 210 as compared to the outflow through clean outlet 215, via valves or otherwise), the pressure or extra flow of the incoming fluid can be used to "drive" the cleaning assembly 230 for as long as desired for a given application.

Thus, in the preferred embodiment, a bi-directional control apparatus 280 ensures complete or improved cleaning of the filter element 225 by the rotor inlet or inlets 245, as shown in FIG. 11A. The bi-directional control apparatus 280 preferably includes a core element or central screw 255 and a sleeve element 285. The core element 255 and sleeve element 285 preferably are concentrically aligned and rotatable with respect to each other. As shown in FIG. 11B and FIG. 11C, the control apparatus 280 preferably further includes a tracking guide 250 having an engaging member 275 for controlling bi-directional axial movement. The tracking guide 250 is positioned to act between the core element 255 and the sleeve element 285. The engaging member 275 preferably cooperates with the core element 255 and the sleeve element 285 during rotation of either the core element 255 or the sleeve element 285. Persons of ordinary skill in the art will understand that a concave surface preferably is provided in the tooth or engaging member 275 (as best shown in FIG. 11B) to ensure a deeper and more secure "seating" of the tooth 275 within the thread path 260. The many alternative embodiments of the invention would include those having flat or other non-concave shapes for the tooth 275.

Persons of ordinary skill in the art will understand that, among the many advantages of the preferred embodiment of the invention, the cleaning cycle can start with the cleaning assembly 230 positioned at any point along the lengthwise axis 257. Thus, unlike prior art systems of which the inventor is aware, the preferred embodiment of this invention does not have to be "pushed" back axially to a starting position as part of each cleaning cycle.

The preferred operation of the bi-directional control apparatus 280 will now be discussed in more detail. Persons of ordinary skill in the art will understand that many alternative methods and processes can utilize various aspects of the invention in various embodiments, in addition to those mentioned here.

In the preferred embodiment, the sleeve element 285 can move relative to the core element 255. By virtue of the preferred linkage between those elements 285 and 255, the preferred movement between them generally is both rotational (around axis 257) and linear (along axis 257). Preferably, as part of that linkage, the core element 255 includes a bi-directional or continuous substantially helical thread 260. However, persons of ordinary skill in the art will understand that the same general operating principles described herein can be used in alternative embodiments, including (by way of example) embodiments in which a bi-directional thread 260 is provided on the inside of a sleeve element 285.

Figure 7:
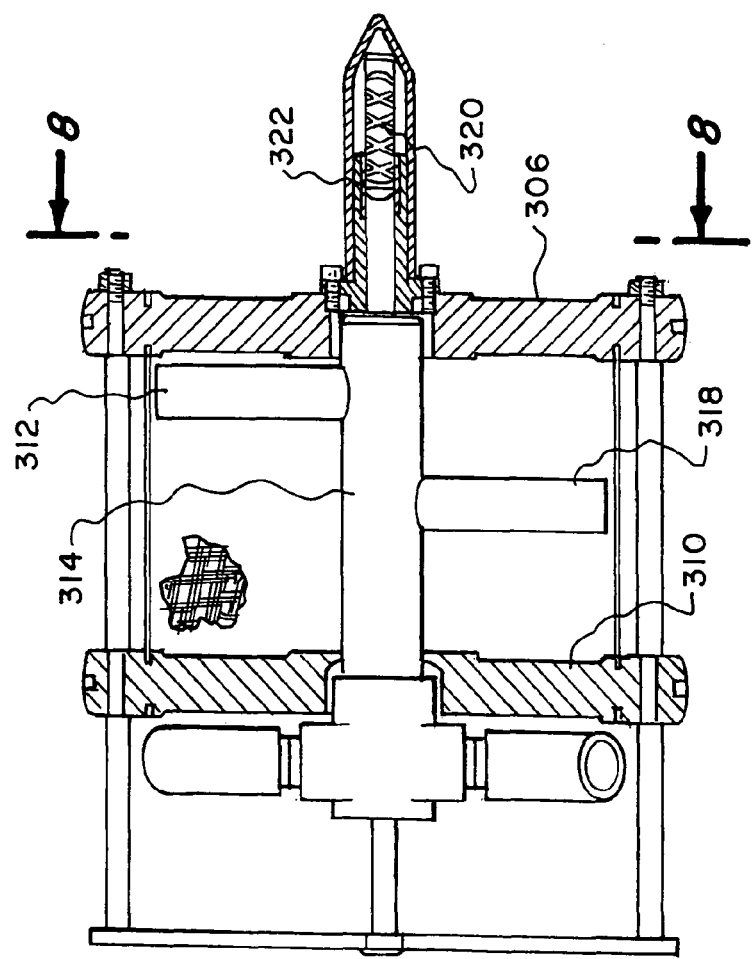
FIG. 7 illustrates some of the internal detail of the assembly of FIG. 5.

Persons of ordinary skill in the art will understand that the linkage to provide the desired rotational and longitudinal movement can take a variety of embodiments. By way of example, and as shown in FIG. 5 and FIG. 7, as well as FIGS. 12-15, the sleeve element 285 is fixed relative to the core element 255 and the pawl element (shown as element 250 in FIG. 14, for example, as describe elsewhere herein) is fixed to the housing 205. Accordingly, instead of the pawl (seated in the assembly 230) rotating about the core 255 (as occurs in the embodiment of FIGS. 2 and 3), the core element 255 rotates with the assembly 230 in a linked relationship with a "fixed" pawl. Persons of ordinary skill in the art will understand that, as with many other alternative embodiments of the invention, the resulting rotation/translational movement can be the same in either case.

As shown in FIG. 11A, during cleaning of the filter, fluid exiting the rotor motor 270 (because of the vacuum force due to the pressure differential between the inside of the filter element and the dirty outlet 220 when it is opened for cleaning) preferably generates a thrust on the motor outlets. That thrust preferably rotates the rotor motor 270 and thereby the entire assembly 230 connected to it. In this embodiment (see FIG. 11A), the sleeve element 285 preferably is connected to the cleaning element 230, so that rotation of the rotor motor 270 rotates the cleaning element 230 and the sleeve element 285.

In the embodiment of FIGS. 2, 3 and 11A, a tracking guide 250, such as a pawl, is held within the sleeve element 285 by a securing member such as a screw, spring, bearing or similarly adapted device or combination of elements. The tracking guide 250 therefore rotates with the sleeve element 285. Preferably, the pawl 250 also can rotate around a vertical axis through the pawl's center in the plane of FIG. 11A, to permit it to thereby align with the changes in orientation of the confronting portion of the groove or thread 260 in which it is engaged. As persons of ordinary skill in the art will understand, that orientation preferably changes (in fact "reverses") at each end of the helical thread pattern 260, so that the linear translational movement of the assembly 230 likewise reverses (and returns in the opposite linear/axial direction) upon reaching each end of the groove 260. Persons of ordinary skill in the art will understand that, so long as sufficient differential pressure exists to rotate the assembly 230, the assembly 230 will contemporaneously traverse back and forth along the length of the thread helix 260.

Said another way, as the assembly 230 and the tracking guide 250 mounted therein rotates around the core 255, the engaging member 275 tracks along the bi-directional thread 260 of the core element 255. Upon reaching the bi-directional thread 260 limit in one direction, the tracking guide 250 pivots (about the vertical axis through the pawl's center in the plane of FIG. 11A, described above) to continue tracking along the bi-directional thread 260, causing further linear displacement of the assembly 230 relative to the core 255, but now in the opposite direction. In this manner, the tracking guide 250 preferably cycles back and forth through a bi-directional thread 260 of the core element or central screw 255. The bi-directional thread path 260 permits the rotor/motor assembly 230 to reverse itself (axially, not radially) and move axially in the opposite direction, vacuuming back over the filter's surface 203 again (and again and again, as long as desired/powered). As mentioned herein, opening of the flush valve 220 for a sufficient period of time thus ensures that no area of the filter surface 203 is left uncleaned, and can even ensure that multiple passes are made in each direction during each cleaning cycle.

In the preferred embodiment, and as best illustrated in FIG. 3, the pitch of the bi-directional thread 260 is preferably configured, among other things, to ensure that a single 360 degree rotation of the vacuum rotor 235 will move the vacuum rotor/motor assembly 230 (and each inlet 245 thereon) axially lengthwise no more than the width "x" (FIG. 3) of the rotor inlet 245. For example, as shown in FIG. 3, if the effective opening of a rotor inlet 245 is a length "x", then a single 360 degree rotation of the vacuum rotor 235 preferably will move the vacuum rotor/motor 230 a distance substantially equal to or less than "x". Limiting axial movement of the rotor/motor assembly 230 to a distance substantially equal to or less than "x" ensures complete coverage of the filter surface 203 by the rotor inlet 245 during the cleaning cycle. Thus, each rotation of the preferred rotor/motor assembly 230 finds a given rotor inlet 245 positioned immediately beside (or overlapping) the path it cleaned on the previous rotation.

Thus, the preferred filter cleaning apparatus of the invention includes a housing having an inlet, a clean outlet, and a flushing outlet; a filter element positioned to filter fluid flowing from the housing inlet to the clean outlet; and a cleaning element having a vacuum rotor. The vacuum rotor further preferably includes one or more rotor inlets positioned to collect debris from the filter element and guide the debris for eventual dispense out the flushing outlet. The cleaning element is configured and positioned to be actuated by opening the flushing outlet, and the vacuum rotor passes over substantially the entire filter element to vacuum debris therefrom. A tracking guide or pawl preferably is positioned between the cleaning element and a central screw, and helps provide the controlled movement of the vacuum rotor inlets over the filter surface during the cleaning cycle.

The present invention includes various methods of filtering fluid and selectively cleaning the filter. In the preferred embodiments, this cleaning is accomplished for many cycles without having to disassemble the apparatus. Initial assembly of the various components of the apparatus can be accomplished by any suitable means. Preferably, the assembly includes the steps of attaching the hydraulic motor 270 to the reverser assembly 230, assembling the bulkheads to the carriage frame, and fastening the nuts (four are illustrated in the embodiments of the figures) to hold the assembly together within the housing.

The methods of the invention further preferably include the steps of filtering fluid until a predetermined pressure differential is reached between fluid flowing into the housing inlet and fluid exiting the clean outlet; and flushing debris from the filter element, i.e., pressure difference between the incoming dirty fluid and the outgoing clean fluid. The flushing step may further include the steps of opening the flushing outlet to actuate the cleaning element and closing the flushing outlet after the cleaning element rotor has passed over the entire surface of the filter element. Preferably, an automatic controller monitors the pressure difference between the fluid flowing from the housing inlet and the fluid exiting the clean outlet. When the pressure difference reaches a predetermined level, the automatic controller is activated and opens the flush valve. The preferred method utilizes the apparatus and functionality of the preferred embodiment of FIGS. 2 and 3, although persons of ordinary skill in the art will understand that other apparatus and other steps can be used as well.

Persons of ordinary skill in the art will understand that, although methods and processes of the present invention have been illustrated and/or described herein with steps occurring in certain orders, the specific order of the steps is not necessarily required, because certain steps are not dependent on certain other steps. Exemplary in that regard, the step of flushing debris from the filter element may occur on a periodic basis, e.g., as a preventive maintenance plan, before the filtering step. Furthermore, the steps of filtering and flushing are not meant to be mutually exclusive of each other, but may occur during substantially the same time.

As best shown in FIG. 2, to reduce the internal stress on the components (during the rotation/cleaning cycle or otherwise), a fluid line (not shown) preferably connects ports 212 (communicating with the liquid inlet 210) and port 297. Persons of ordinary skill in the art will understand that, among other things, this line equalizes or generally balances the net pressure that otherwise would act on the inlet 210 side of the apparatus to force the rotor/motor assembly 230 to the left (as viewed in FIG. 2). Preferably, the pressure on the "high pressure" side of the solid bulkhead in FIG. 2 is transmitted through the port 212 via the line (not shown) to provide that same "high pressure" through port 297 to chamber 295. Persons of ordinary skill in the art will understand that the pressure in chamber 295 can then act on the piston assembly 299 to exert a counteracting force to the right, to offset or equalize the aforementioned pressure to the left. Although this type of balance is not required in order to enjoy certain benefits of the invention, that balance preferably improves performance and reduces wear and stress on the various components. Further in that regard, persons of ordinary skill in the art will understand that the entire portion of the preferred embodiment of FIG. 2 to the right of the solid bulkhead preferably is in fluid communication (including on both sides of the open bulkhead, through that open bulkhead or otherwise), so that the only "low pressure" zone in the system is that to the left of the solid bulkhead (except that the chamber 295 can be connected to high pressure via the port 297, as mentioned above).

Another of the many embodiments of the invention is illustrated in FIGS. 12-18. It shows the filter cleaning apparatus 400 of FIG. 12, and preferably includes many of the components as previously described with regard to other embodiments shown in FIGS. 2-11. These components preferably include a housing 205 having an inlet 210, a clean outlet 215, and a flushing outlet 220; a filter element 225 positioned to filter fluid flowing from the housing inlet 210 to the clean outlet 215; and a cleaning or reciprocating element 230 having a vacuum rotor 235. The vacuum rotor 235 further preferably includes one or more rotor inlets 245 positioned to collect debris from the filter element 225 and guide the debris for eventual dispense out the flushing outlet 220. The cleaning element 230 is configured and positioned to be actuated by opening the flushing outlet 220, and the vacuum rotor 235 passes over substantially the entire filter element 225 to vacuum debris therefrom. A tracking guide or pawl 250 preferably is positioned between the cleaning element 230 and a central screw 255, and helps provide the desired controlled movement of the vacuum rotor inlets 245 over the filter surface during the cleaning cycle.

The embodiment of FIGS. 12-18 illustrates, among other things, one of the many alternative embodiments and ways to reduce the internal stress on the components (during the rotation/cleaning cycle or otherwise). As described in greater detail below, rather than using a fluid line (not shown in FIG. 2) to connect ports 212 (communicating with the liquid inlet 210) and port 297 to equalize or generally balance the net longitudinal pressure that otherwise would act on the central reciprocating cleaning assembly, the embodiment of FIGS. 12-18 generally (a) isolates each end of that central reciprocating cleaning assembly within a chamber and (b) provides a pressure communicating pathway between those chambers. Preferably, the net effective area of each end (the effective cross-sectional area on which that pressure in each chamber exerts longitudinal force) is equal, and the pathway ensures that equal pressure exists within each chamber. Consequently, there is little, if any, net longitudinal force on the central reciprocating cleaning assembly. In other words, the force (or pressure times the effective cross-sectional area) is the same on each end of the assembly.

In other words, for embodiments such as shown in FIGS. 12-18, pressure on the "high pressure" or inlet side of the solid bulkhead preferably is not communicated into the chambers 420 or 421. Instead, those chambers are each respectively sealed except for the reciprocation of the central cleaning assembly into and out of the chambers, and except for a pressure communication path between the chambers. As described herein and shown in FIGS. 12-18, that path includes a portion through the central cleaning assembly itself. In alternative embodiments, that path could instead include tubing or a line external to the central cleaning assembly (such as described above in connection with FIG. 2, to connect port 212 through port 297 to chamber 295), connecting the chambers 420 and 421.

As with the pressure offset or balancing describe above in connection with FIG. 2, persons of ordinary skill in the art will understand that the pressure in chambers 420 and 421 can then act on the respective ends of the cleaning or piston assembly to exert counteracting or balancing forces, to offset or equalize or "net out" any longitudinal (to the right or left when viewing FIG. 12, for example) pressure that might be imposed on the central cleaning assembly, during reciprocation thereof or otherwise. Again, although this type of balance is not required in order to enjoy certain benefits of the invention, that balance preferably improves performance and reduces wear and stress on the various components.

Figure 12:
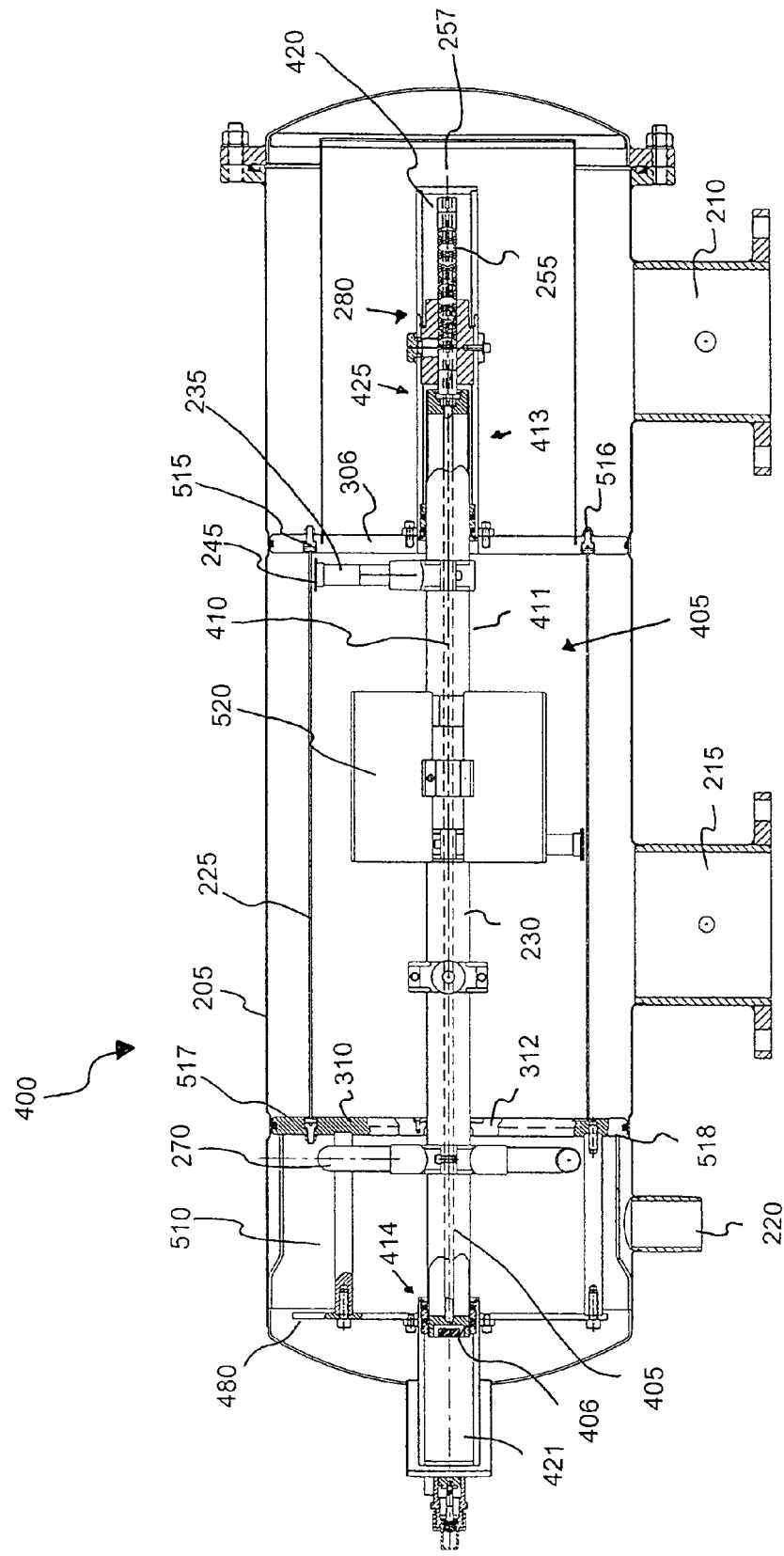
FIG. 12 is a sectional view of a preferred embodiment of the present invention.

More specifically, the counterbalance or offset of pressure provided by the external fluid line connecting FIG. 2's port 212 (communicating with the liquid inlet 210) and port 297, as described hereinabove, may be modified to communicate between or act on chambers 420 or 421. If so modified, it may be supplemented with an internal pressure offset mechanism 405 operatively positioned substantially between a first chamber 420 and a second chamber 421, as shown in FIG. 12. FIG. 12 actually shows only the internal pressure offset mechanism 405, but persons of ordinary skill in the art will understand that it could be combined with the external tubing described above, or either one could be used independently of the other. In any case, the pressure offset mechanism 405 reduces stress on the various components by effectively communicating and equalizing pressure (and even allowing displacement of gas or liquid) from an area of potential high pressure to an area of relatively lower pressure. In the embodiment of FIGS. 12-18, movement of the reciprocating cleaning element 230 traversing bi-directionally (as described herein) can cause such cyclical pressure changes in either or both of the chambers 420 and 421, and the pressure offset mechanism 405 neutralizes the effect of any such changes by communicating fluid/gas matter and accompanying pressure between the chambers.

Persons of ordinary skill in the art will understand that the term "pressure" as used herein is a broad term generally used in its ordinary meaning and typically applies, without limitation, to a gas (air for example), or a liquid (water or oil for examples). As used herein, "matter" would include at least such gases and liquids.

Accordingly, the invention preferably provides a relatively balanced pressure zone in which the cleaning element 230 can reciprocate with substantially no net longitudinal fluid pressure. Preferably, the balanced pressure zone includes the first chamber 420 receiving a first end 413 of the cleaning element 230, and a second chamber 421 receiving a second end 414 of the cleaning element 230 with pressure balancing means acting between the first chamber 420 and the second chamber 421 to permit the flow of fluid and/or the communication and equalization of pressure therebetween. In one embodiment, the pressure offset mechanism or pressure balancing means 405 includes a tubular pathway external to the cleaning element 230 (provided by fluid line connecting ports 212 and 297, as previously described in connection with FIG. 2). In embodiments such as illustrated in FIGS. 12-18, the offset pressure mechanism or pressure balancing means 405 includes a pathway through the cleaning element 230 itself. This can be provided in any suitable manner, shape, or form, and is illustrated as a central tube 410 disposed in an outer tube 411). The smaller central tube 410 preferably is mounted within and along the centerline of the outer tube 411, so that both rotate about the same longitudinal axis, with little or no eccentric forces during cleaning cycles. The inner tube 410 is operatively connected to the chambers 420 and 421, but is otherwise sealed from the other space inside the tube 411 (that other space functions as a pathway to vacuum the debris from the filter during cleaning cycles, as described elsewhere herein).

The cleaning assembly tubes 410 and 411 preferably are operatively connected to the control apparatus 280, so that those elements rotate together during the cleaning cycle, and the helical track/pawl interaction described herein forces the assembly back and forth along the longitudinal centerline/axis (to the right and left when viewing FIG. 12, for example). Although any suitable connection can be utilized, including fabrication from a single contiguous piece of material, preferably the tubes 410 and 411 are connected to the control apparatus 280 via a "universal"-type joint 425, that allows for some misalignment of the various components along that center axis (or allows for less than perfect alignment therebetween). Details of a preferred "universal" joint 425 are shown in other of the figures and described below.

For example, as the cleaning assembly 230 moves in a right-to-left direction in FIG. 12, a left or second end 414 (having an effective piston head 406) of the reciprocating cleaning assembly acts as a piston within the chamber 421. If there were no outlet to allow flow out of that chamber or otherwise relieve pressure from that chamber, the movement of the end 406 into that chamber would increase the pressure therein. The same thing would happen on the other end of the reciprocating cleaning assembly as it moves back to the right during the reciprocating cleaning motion, increasing the pressure within the chamber 420 (and vacuums may be pulled in the chambers when the reciprocating cleaning assembly moves "out" of the respective chamber). If nothing is done to address this, those pressures/vacuums can occur with every "stroke" of the reciprocating cleaning assembly, and may cause internal stress and eventual failure or at least undue wear on components throughout the assembly.

Moreover, such forces will increase the friction and corresponding resistance to the desired rotation/movement of the cleaning element, thereby reducing its efficiency (e.g., the cleaning heads will not rotate as many times over the filter surface as they otherwise would, due to drag and energy lost to such friction).

Preferred embodiments of the invention address this by allowing air (or whatever fluid or gas is in the chamber 421) to be displaced from the left side of the filter assembly 400 through the second end 414 of the central tube 410, through the cleaning assembly along the length of the tube 410, to the right side of the filter assembly 400. At that location, the matter (or at least the increased pressure caused by the of the piston-head 406 into the chamber 421) is first displaced or communicated to an area 422 adjacent the bushing or sleeve element 285. The pressure/matter is further displaced/communicated from that area 422 through at least one channel (not shown, but represented by reference 415) within the sleeve element 285 to a first chamber 420 on the other side of the sleeve element 285 that houses the central screw 255. Accordingly, as the area 422 adjacent the sleeve element 285 is preferably in direct pressure communication via channel 415 with the first chamber 420 on the right side of the filter assembly 400, the first chamber 420 may be considered to include (among other spaces or areas) that area 422 between the sleeve element 285 and the connecting cap 465. In a larger context, the first chamber 422 can be considered to include everything within the housing 423 (formed from the threaded engagement of two preferably cylindrical pieces 424 and 426). The right-hand end of chamber 422 is provided by a cap 427 on the end of the cylinder 426. Persons of ordinary skill in the art will understand that the chamber housing 423 (comprised of elements 424 and 426) preferably is sealed to the open bulkhead 306 via bolts 476 and 477 and gaskets or other sealing means associated with that joint.

In a similar manner, the housing 428 preferably defines and seals the second chamber 421 surrounding the left end of the reciprocating cleaning assembly, to the bulkhead 481. Among other things, for embodiments using an external tubing pathway on an assembly such as shown in FIGS. 12-18, the tubing could be connected from the end plate 427 or some other portion of housing 423, run outside the pressurized filter tank, and connected to the housing 428 on the other end.

The preferred various threaded engagements of elements described herein facilitate not only initial assembly of the apparatus, but also maintenance and repair that may be needed over the life of the apparatus. Thus, the right-hand end of the assembly preferably can be assembled by welding the inner tube 410 to the cap 465, inserting that assembly within the outer tube 411 and welding or otherwise fixing that cap 465 into the relationship shown with tube 411 (see FIG. 13, for example). Preferably, these connections are all leak tested, to ensure that none of the subject fluid or any other contaminants get into the center tube 410 or the first or second chambers 420 and 421. The core rod 430 can be fixed to the cap 465 via pin 460, the sleeve 435 can then be pinned into place using pin 450, and the outer helical-grooved sleeve 255 slid on and tightened into place by putting on and tightening the nut 455. The flexible sleeve 470 is assembled over the pins 450 and 460. The first portion 424 of housing 423 is then placed around the assembly in approximately the position shown in FIG. 13. Bushing or sleeve element 285 can then be slid over the grooved sleeve 255 and engaged in the end of the housing portion 424. It is held in that location by inserting screw 472 through the side of the housing 423 into the bushing 285. The pawl 250 can be inserted and held in place by a capscrew 253. A spherically rounded head 254 on the pawl 250 preferably facilitates and ensures that the pawl will rotate as desired during the cleaning cycle, to interact properly with the track on the helical sleeve 255. Finally, an O-ring 600 can be inserted into the joint between housing portions 424 and 426, to provide a watertight seal, and the remaining portion 426 of housing 423 is screwed into the first housing portion 424. The assembled housing may be bolted to the bulkhead 306 at any convenient time during the assembly. The other pieces of the filter assembly can then be assembled from the left-hand end, generally in the order of their position down the center axis.

When the cleaning assembly 230 is moving in a left-to-right direction, pressure that may cause stress on components is displaced or communicated from the right side of the filter assembly 400 (from chamber or housing 423 through the first end 413 of the central tube 410 to the second chamber 421 on the left side of the filter assembly 400.

In the embodiment of FIGS. 12-18, a first chamber 420 thus receives a first end 413 of the reciprocating element 230, and a second chamber 421 receives a second end 414 of the reciprocating element 230. Preferably, the first and second ends 413, 414 of the reciprocating element 230 are operatively linked to each other (via the components described herein or otherwise) so that they move longitudinally substantially in unison with each other as an assembly, and are each preferably configured to have substantially the same effective longitudinal pressure area (or the same effective "piston head size") on each end on which any longitudinal pressure acts. In addition, preferably, the first and second chambers 420, 421 are substantially sealed about their respective ends so that the reciprocating element 230 acts as a piston therein during reciprocation. A central tube or passage 410 through the reciprocating element 230 connects the first and second chambers 420, 421 so that when the reciprocating element 230 moves longitudinally the pressure at least substantially equalizes between and within the first and second chambers 420, 421. In other words, the pressure or vacuum in chamber 420 is communicated to chamber 422, and vice versa.

Accordingly, in one embodiment, the first end 413 and the second end 414 of the cleaning element 230 have an effective cross section substantially equal to each other whereby the pressure balancing means 405 is effective to substantially prevent any pressure that may exist within the first chamber 420 or the second chamber 421 to be exerted longitudinally on the cleaning element 230.

Figure 13:
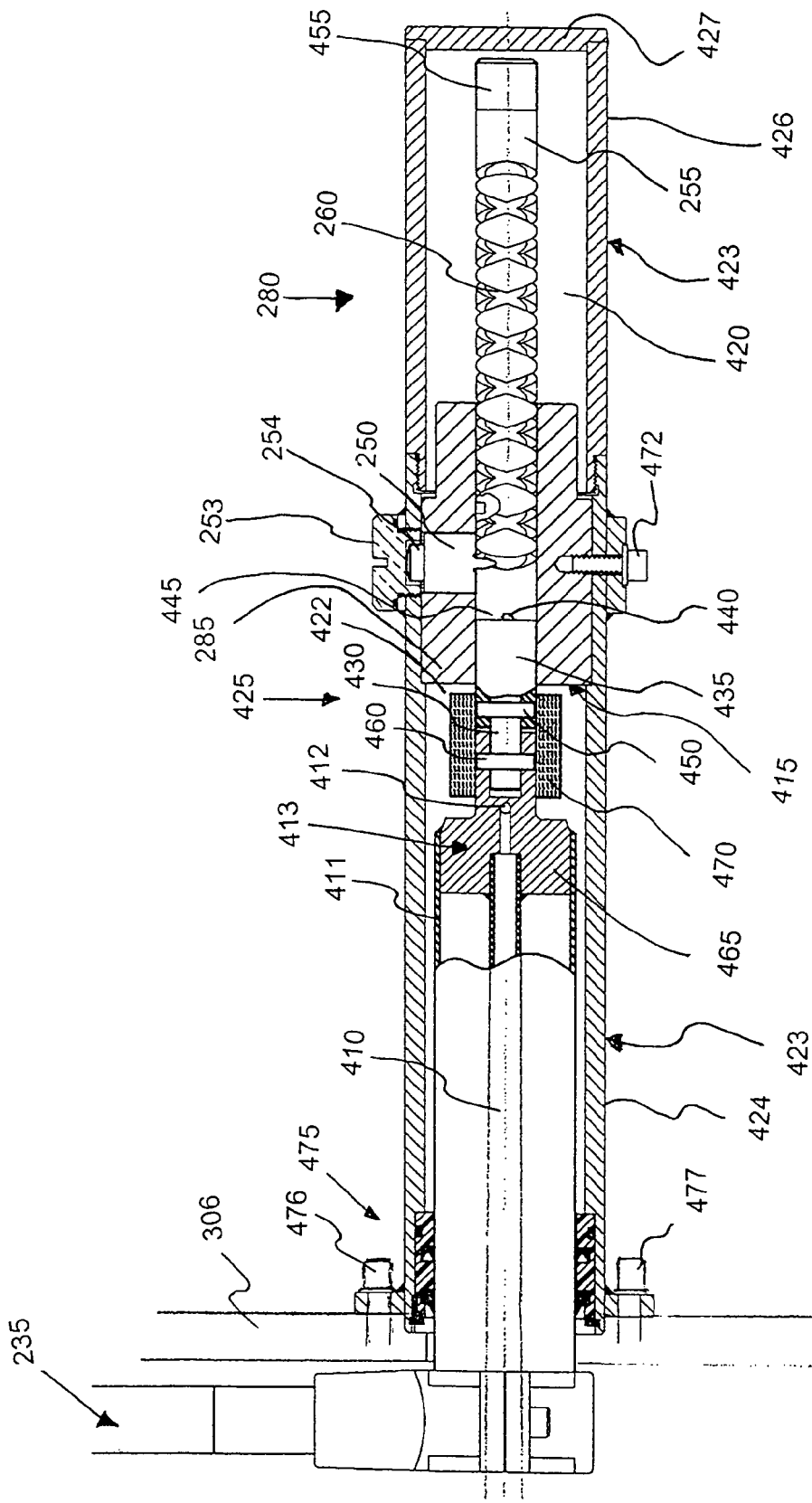
FIG. 13 is enlarged view of a portion of the right side of FIG. 12.

As shown in FIG. 13, the central tube 410 and outer tube 411 of the pressure balancing apparatus 405 are preferably coupled to the sleeve element 285 by the universal type joint 425. To facilitate that coupling, a core rod 430 preferably passes through and extends from opposite ends of the central screw or helically-threaded sleeve 255.

Figure 14:
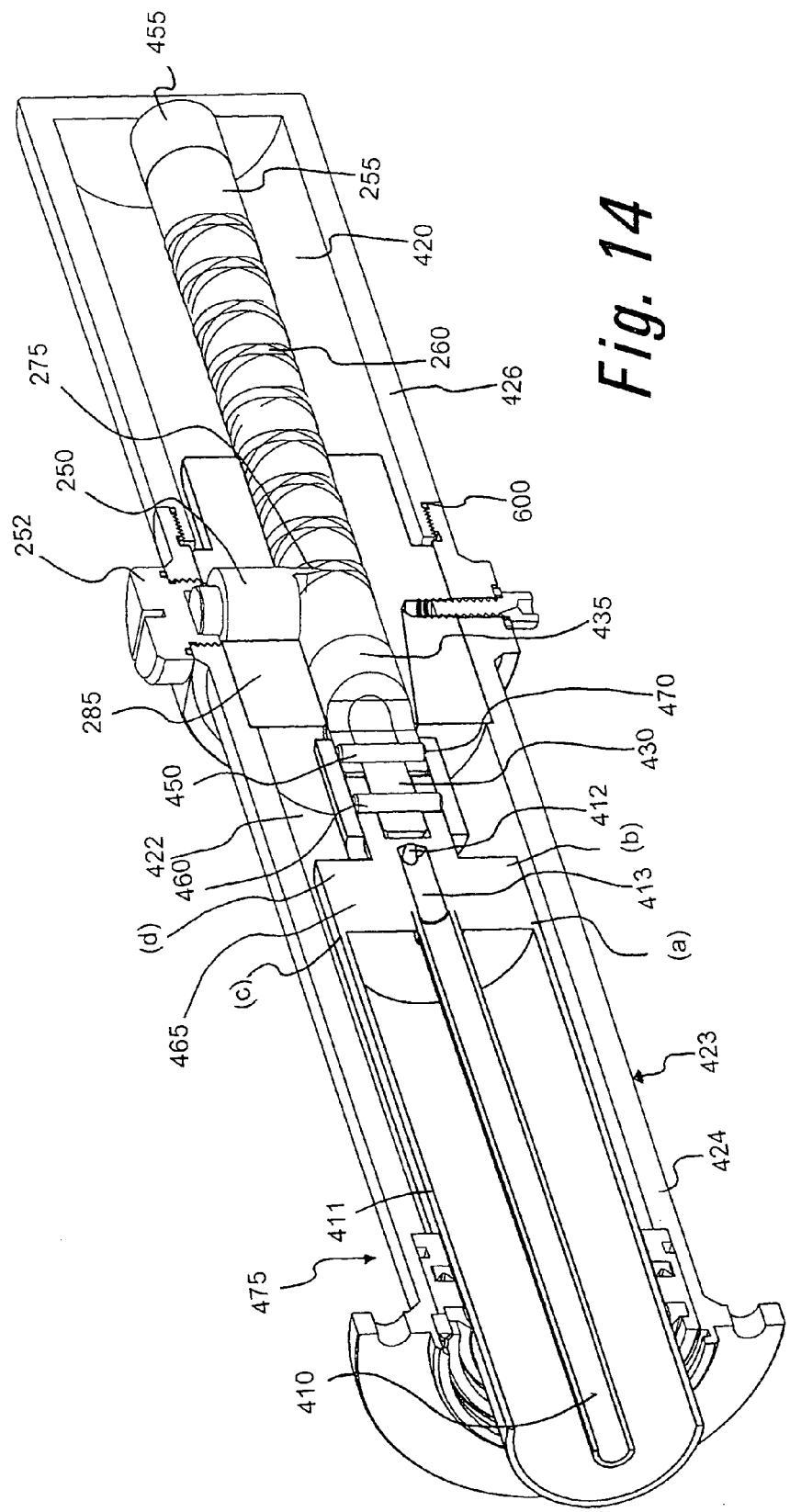
FIG. 14 is a cutaway perspective view of FIG. 13.

As shown in FIG. 14, one end of the core rod 430 further passes through a connecting cap 435 having at least one extension 440 (preferably four evenly spaced extensions are provided) for engaging correspondingly shaped indents 445 on the end of the central screw 255. A first pin 450 is preferably press fitted into an appropriately sized hole to join the connecting cap 435 to the core rod 430. The opposite end of the core rod 430 is preferably threaded to receive a correspondingly threaded nut 455. By tightening the threaded nut 455 onto the threaded end of the core rod 430 (the right-hand end, as viewed in FIG. 13), the first pin 450 (connected on the opposite end of the core rod 430) is drawn toward the nut 455 effectively securing the connecting cap 435 to the central screw 255 and engaging the detents 440 and 445 so that the central screw 255 (actually a sleeve around the core rod 430) will rotate and reciprocate along with the rest of the cleaning assembly.

As further shown in FIG. 14, a second pin 460 is preferably press fitted (in a loose or "sloppy" fit, to provide the desired "universal joint" flexibility of this part of the assembly) into the core rod 430 and an end plug 465. The end plug 465 is positioned and secured, preferably by soldering or similar type methods at points (a)-(d), into one end of an outer tube 411. In this manner, the outer tube 411 is joined to the central screw 255 by the universal type joint 425. Accordingly, as the central screw 255 rotates about and moves bi-directionally along the lengthwise axis 257, so does the central tube 410 and the outer tube 411. Preferably, a flexible coupling or cover 470 (formed from silicone tubing or the like) is positioned around the connecting cap 435 and end plug 465 where each is joined by the first pin 450 and the second pin 460. Preferably the cover 470 has sufficient strength to help prevent the undesirable disengagement of the pins 450 and 460 during use of the apparatus.

As indicated above, preferably the central tube 410 is enclosed by the outer tube 411 and is preferably joined to the end plug 465 in such a way (by welding, soldering, or the like) so as to allow pressure displacement into the central tube 410 from the first chamber 420 when the central screw 255 moves from left to right. As shown in FIGS. 13-14, in one embodiment, the chamber 420 includes all space within the housing elements 424 and 426 (assembled into housing 423). Preferably, central tube 410 terminates with a port 412 (shown as a hole communicating from the centerline of the end plug 465 out into the area or space 422 between the end plug 465 and one side of the sleeve element 285). That port, like most or all of the other ports described herein, can be of any suitable size and orientation, and can be fabricated in any suitable manner, such as by drilling or machining a hole into the plug 465. As described herein, and further shown in FIG. 14, that chamber area or space 422 may extend along the exterior of the outer tube 411 to a first bearing assembly 475. That chamber area or space 422 also is preferably in direct pressure communication with an area on the opposite side of the sleeve element 285 via a hole or other passageway (not shown) provided or formed therein. Accordingly, when the cleaning assembly 230 moves longitudinally from left to right, pressure is displaced from the first chamber 420 through the central tube 410 to the second chamber 421 on the opposite side of the filter assembly 400. Likewise, the port 412 allows pressure displacement out of the central tube 410 into the first chamber 420 when the central screw 255 moves from right to left.

Preferably, pressure is communicated into and out of the second chamber 421 at the opposite end of the central tube 410 through channels 490, 491 connected to the central tube 410 and preferably housed (or formed or machined) within a plug element 495 positioned in the end of the central tube 410. As further shown in FIG. 15, a first magnetic element 500 is preferably also positioned within the plug element 495 to facilitate activation of an indicator assembly 505 (to provide easy confirmation of when the cleaning element is reciprocating, for embodiments where that is not otherwise visible from the outside of the apparatus), as described below.

As indicated herein, the aforementioned components preferably are fabricated from suitably strong materials to withstand the various pressures and cyclical repetitions of movements described herein. For example, in the preferred embodiment, the central tube 410 and end plug 465 are constructed of stainless steel, and the flexible coupling 470 is preferably constructed of silicone tubing. In addition, persons of ordinary skill in the art will understand that the many of the materials preferably should be resistant to corrosion and other deterioration that may be associated with the various liquids and debris being filtered or to which they will be exposed during use of the invention.

Preferably, and as shown in FIG. 14, bolts 476, 477 secure the housing 423 (with one end of the outer tube 411 slidably disposed therein) to the bulkhead 306. The first bearing assembly 475 is located near those bolts 476, 477 and seals the filter assembly 400 in a sliding relationship, so that it can reciprocate through the bulkhead 306. Similarly, a second bearing assembly 478, FIG. 15, preferably facilitates a sliding/sealed relationship between the other end of the outer tube 411 within the housing 428. Like housing 423, housing 428 is does not reciprocate, but instead is fixed to and the solid bulkhead 310 (all within the flushing chamber 510) by bolts 479, 480 which attach the assembly to the support member 481 (which in turn is attached to the bulkhead 310).

The entire reciprocating cleaning assembly (and the housings 423 and 428 in which its ends reciprocate) preferably is watertight, so that the only flow into it will occur during the cleaning cycle, when the flushing valve is opened to clean the filter element.

Figure 15:
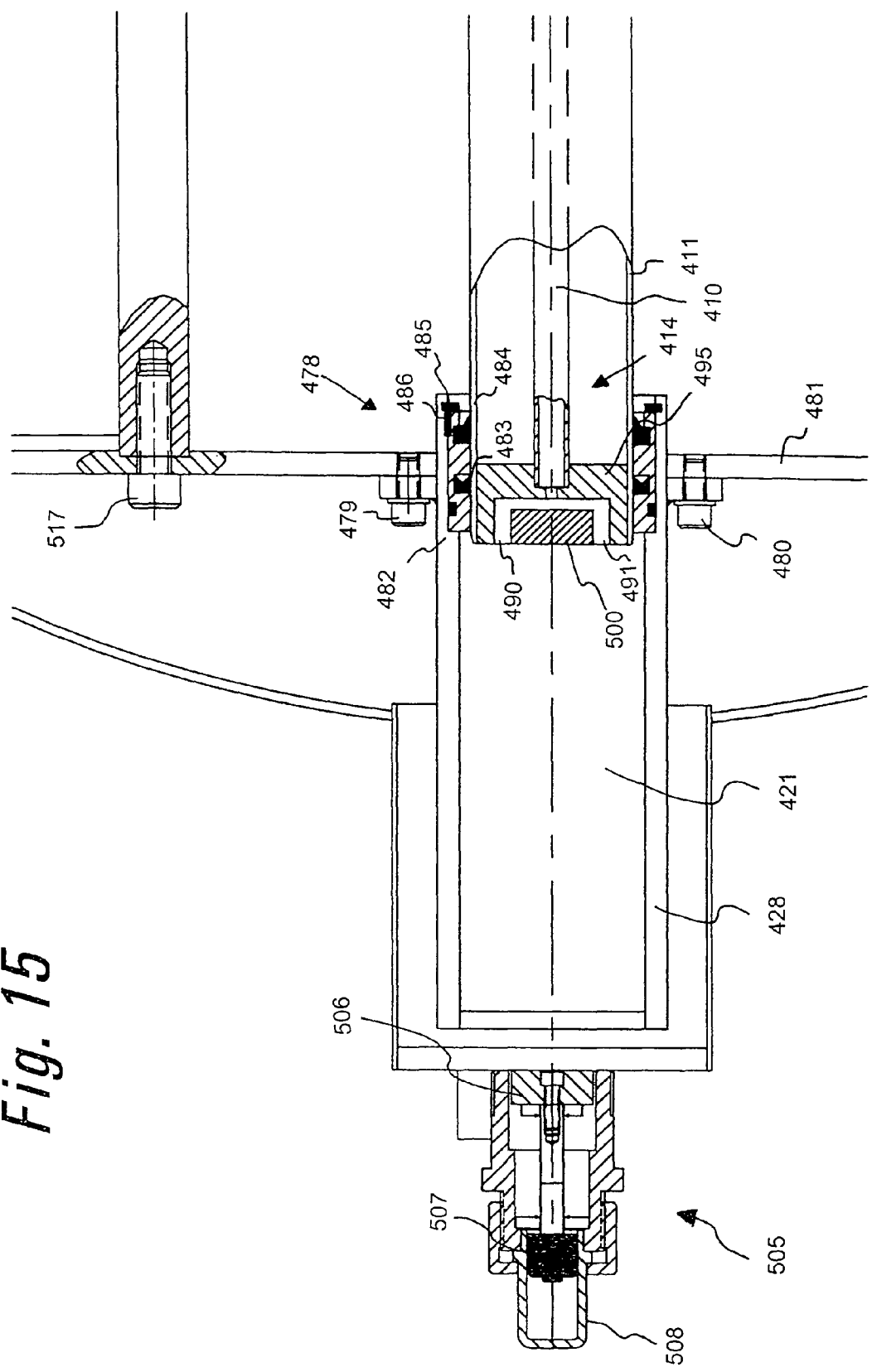
FIG. 15 is enlarged view of a portion of the left side of FIG. 12.

Preferably, as shown in FIGS. 13 and 15, the first and second bearing assemblies 475, 478 each include a snap ring 482 to hold the bearing assemblies 475, 478 in place, a cup seal 483 and a wipe seal 484 to prevent liquid or contaminants from entering the first and second chambers 420, 421 positioned at opposite ends of the outer tube 411, an o-ring 485, and a retaining pin 486 to prevent the bearing assemblies 475, 478 from turning with the outer tube 411.

Figure 16:
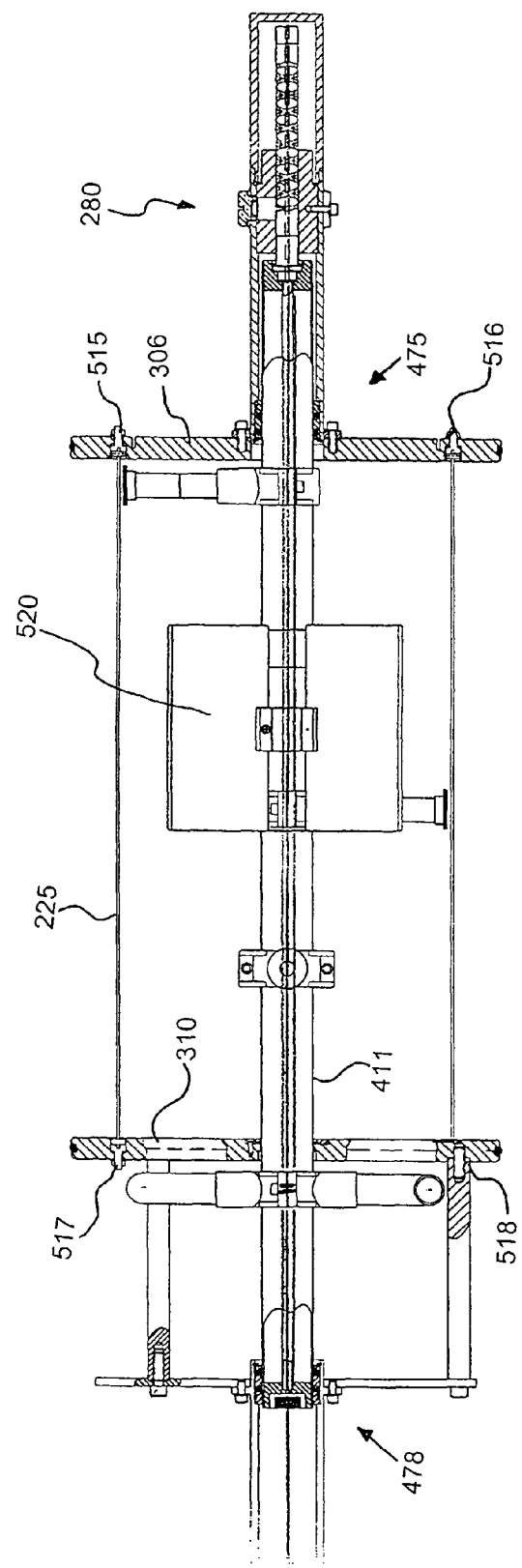
FIG. 16 is a sectional view of the present invention with the filter housing removed of FIG. 12 removed.

As shown in FIG. 16, to facilitate maintenance and ease of service to the filter unit 400, the entire internal workings of the filter assembly 400 including control apparatus 280, rotors 235, pressure offset mechanism 405 including bearing assemblies 475, 478, and filter element 225 (connected to the open bulkhead by bolts 515, 516, and the solid bulkhead by bolts 517, 518) may be withdrawn from the filter housing 205.

As shown in FIGS. 12, 16-18, the filter assembly 400 may optionally include a speed reducer or governor 520 to slow the bi-directional movement of the cleaning apparatus 230 thereby providing more time for the vacuum rotors 235 to collect debris from the filter element 225.

Preferably, the speed reducer 520 includes a plurality of paddles 521, 522, 523, . . . etc., each attached to the outer tube 411 by hardware 525, as shown. As described herein, opening the flushing outlet 220 activates the cleaning assembly 230 to rotate the vacuum rotors 235 in response to fluid pressure on the rotor motors 270. Rotation of the vacuum rotors 235 through the fluid medium is slowed as the relatively larger surface area of the each paddle 521, 522, etc. provides rotational resistance to the cleaning assembly 230. By one account, the rotational speed of a cleaning element 400 with a speed reducer 520 is approximately 66 revolutions per minute (rpm) as compared to the rotational speed of approximately 239 rpm for a cleaning element 400 without such a speed reducer 520. In terms of cleaning time, given enough flushing pressure to rotate the cleaning assembly 230 through a complete cycle, one embodiment of the speed reducer 520 increases vacuum rotor cleaning time from about 5.5 seconds to about 20.0 seconds. Persons of ordinary skill in the art will understand that the choice of paddle size (length and/or width, or any paddles at all), spacing, and number will depend on various factors including, among others, the viscosity of the fluid being filtered, the contaminants therein, the required cleaning duration, and flushing pressure.

As shown in FIG. 15, the filter assembly 400 may further include an indicator assembly 505 for indicating bi-directional movement or travel of the cleaning assembly 230. In this regard, as the cleaning assembly 230 including the pressure offset mechanism 405 move from right-to-left within the filter assembly 400, the first magnet 500 housed with the plug element 495 near one end of he outer tube 411 moves toward a second magnet 506 positioned within the indicator assembly 505. As the first magnet 500 nears the second magnetic 506, repelling electro-magnetic forces between the first magnet 500 and the second magnetic 506 cause the second magnet 506 to move toward a spring loaded indicator 507 causing the indicator 507 to become visible within a viewing chamber 508. During left-to-right movement of the cleaning assembly 230, the first magnet 500 moves away from the second magnet 505, repelling forces cease between the first magnet 500 and the second magnet 506, and the magnets 500, 506 return to their original positioning. Accordingly, as the cleaning assembly 230 cycles bi-directionally, the indicator 507 cycles in and out of the viewing chamber 508 indicating proper bi-directional travel of the cleaning assembly 230.

As indicated above, the number, size, and position of the various components (such as rotor inlets, motor outlets, dirty inlets, clean outlets, flush outlets, etc.) of the invention can vary, depending on the application and other factors. The invention may be used with a wide variety of fluids and applications, and the materials from which the components are constructed can be any suitable substances.

The apparatus and methods of the invention have been described with some particularity, but the specific designs, constructions and steps disclosed are not to be taken as delimiting of the invention. Obvious modifications will make themselves apparent to those of ordinary skill in the art, all of which will not depart from the essence of the invention and all such changes and modifications are intended to be encompassed within the appended claims.

What is claimed is:

1. Apparatus for balancing net longitudinal pressure on a reciprocating and rotating element, including a first chamber receiving a first end of said reciprocating element, a second chamber receiving a second end of said reciprocating element, said first and second chambers substantially sealed about their respective ends of said reciprocating element so that said reciprocating element acts as a piston therein during reciprocation, said first and second ends of said reciprocating element configured to have substantially the same effective longitudinal pressure area on each end on which any longitudinal pressure acts, a passage through said reciprocating element connecting said first and second chambers to substantially equalize the pressure in said first and second chambers, so that the substantially equalized pressure acts on the said substantially the same effective longitudinal pressure area on each end of the reciprocating element, resulting in a substantially balanced net longitudinal force acting upon the reciprocating element.

2. The apparatus of claim 1, in which said reciprocating element is a cleaning element positioned within a pressurized filter, and said apparatus substantially eliminates any net longitudinal pressure on said reciprocating element.

3. A method for filtering fluid, including the steps of:
providing the apparatus of claim 2;
pumping subject fluid through said apparatus through an inlet, a filter, and an outlet; and, periodically actuating said reciprocating cleaning element to remove accumulated debris from said filter.

4. Apparatus for balancing the longitudinal pressure exerted on opposing ends of a reciprocating piston-like element, including:
a reciprocating element having a first end positioned in a first chamber and a second end positioned in a second chamber, said first end and said second end operatively linked to each other so that they move longitudinally substantially in unison with each other, said reciprocating element configured so that longitudinal reciprocation of said element causes each end to act substantially as a piston within its respective chamber;
a communication path between said first and second chambers to permit movement of matter between the chambers in response to longitudinal reciprocation of said reciprocating element, said communication path including a pathway within said reciprocating piston-like element.

5. The apparatus of claim 4, further including rotating means to cause the reciprocating piston-like element to rotate about its longitudinal axis during reciprocation of said element, and in which the matter moved between the chambers is air.

6. The apparatus of claim 5, further including cleaning arms positioned on said reciprocating piston-like element, said cleaning arms positioned to remove accumulated debris from a filter element during said rotation and reciprocation.

7. A filter apparatus, including:
a housing having an inlet for receiving dirty fluid and an outlet for releasing filtered fluid;
a filter within said housing to remove contaminants from the fluid;
a filter cleaning element within said housing to periodically remove accumulated contaminants from said filter, said filter cleaning element having a first end and a second end each positioned within its own respective chamber, said filter cleaning element configured to move along a longitudinal axis when cleaning said filter, said longitudinal displacement causing said first and seconds ends to act as pistons within their respective chambers, said first and second ends configured to provide an effective longitudinal pressure area within their respective chambers that is approximately equal; and
means for substantially equalizing the pressure within the first and second chambers, said equalizing means including a passage through said filter cleaning element.

8. The filter apparatus of claim 7, in which said pressure equalizing means includes tubing connected between said first and second chambers.

9. A filter apparatus including:
a housing having an inlet for receiving dirty fluid and an outlet for releasing filtered fluid,
a filter within said housing to remove contaminants from the fluid,
a filter cleaning element within said housing to remove accumulated contaminants from said filter,
a relatively balanced pressure zone within said housing, said cleaning element being positioned within said zone, said filter cleaning element capable of moving axially within said zone across areas of said filter at which said contaminants have accumulated to remove said contaminants from said areas, with substantially no net longitudinal/axial fluid pressure exerted on said filter cleaning element,
wherein said balanced pressure zone includes a first chamber receiving a first end of said cleaning element and a second chamber receiving a second end of said cleaning element,
said balanced pressure zone further includes pressure balancing means communicating between said first chamber and said second chamber to substantially equalize the pressure in those chambers,
said pressure balancing means including an internal passage through said filter cleaning element connecting said first chamber and said second chamber.

* * * * *